United States Patent [19]

Mutoh et al.

[11] Patent Number: 4,749,873
[45] Date of Patent: Jun. 7, 1988

[54] ANTI-THEFT DEVICE FOR AN AUTOMOBILE

[75] Inventors: Masahito Mutoh; Masaki Azuma, both of Toyota, Japan

[73] Assignee: Toyota Jidosha Kabushiki Kaisha, Japan

[21] Appl. No.: 888,921

[22] Filed: Jul. 24, 1986

[30] Foreign Application Priority Data

Jul. 25, 1985 [JP] Japan ............................ 60-114231[U]
Oct. 16, 1985 [JP] Japan ................................ 60-231996

[51] Int. Cl.⁴ ............................................. B60R 25/04
[52] U.S. Cl. .............................. 307/10 AT; 307/10 R; 307/9; 361/172; 340/64
[58] Field of Search ..................... 307/9, 10 AT, 10 R; 361/171, 172, 173, 190, 191, 192, 193, 194, 195, 196; 340/63, 64, 65, 52 H, 52 R, 52 F, 274 L; 70/277, 278, 240, 241, 256, 289, 258, 252, 241, 237, 238, 239; 123/179 BG, 146.5 B, 179 K, 179 L; 200/61.47, 61.52; 180/167

[56] References Cited

U.S. PATENT DOCUMENTS

| | | | |
|---|---|---|---|
| 3,610,943 | 10/1971 | Jones | 307/10 AT |
| 3,634,880 | 1/1972 | Hawkins | 340/63 |
| 3,718,202 | 2/1973 | Brock | 361/172 X |
| 3,755,776 | 8/1973 | Kotras | 340/63 X |
| 3,784,839 | 1/1974 | Weber | 307/10 AT |
| 4,050,063 | 9/1977 | Schull | 70/278 X |
| 4,090,089 | 5/1978 | Morello et al. | 307/10 AT X |
| 4,107,645 | 8/1978 | Lewis et al. | 180/283 X |
| 4,189,708 | 2/1980 | Bryll | 340/64 |
| 4,218,763 | 8/1980 | Kelley et al. | 340/65 |
| 4,240,516 | 12/1980 | Henderson et al. | 180/289 |
| 4,280,118 | 7/1981 | Brunken et al. | 361/171 X |
| 4,291,237 | 9/1981 | Kitano | 340/64 X |
| 4,292,541 | 9/1981 | Ambrosius | 361/171 X |
| 4,327,353 | 4/1982 | Beard et al. | 340/64 |
| 4,342,024 | 7/1982 | Rossi | 340/64 |
| 4,347,545 | 8/1982 | Weishaupt et al. | 361/172 |
| 4,383,242 | 5/1983 | Sassover et al. | 307/10 AT X |
| 4,420,794 | 12/1983 | Anderson | 307/10 AT X |
| 4,438,426 | 3/1984 | Adkins | 307/10 AT X |
| 4,446,380 | 5/1984 | Moriya et al. | 307/10 AT |
| 4,463,340 | 7/1984 | Adkins et al. | 307/10 AT X |
| 4,486,806 | 12/1984 | Mochida et al. | 307/10 AT X |

FOREIGN PATENT DOCUMENTS

58-35694  3/1983  Japan .
86775  6/1983  Japan .

Primary Examiner—William M. Shoop, Jr.
Assistant Examiner—Paul Ip
Attorney, Agent, or Firm—Parkhurst & Oliff

[57] ABSTRACT

An anti-theft device for an automobile with high reliability is proposed. The device detects an intrusion and a battery disconnection and disables the engine. The device is powered by a battery prepared exclusively for the device besides the main battery of the automobile. The battery is mounted on the same board as the device, therefore increasing the reliability of that device. The device is simple to operate. When the driver leaves the car and the doors are locked, the anti-theft device is activated. No additional operation is required from the driver. The anti-theft device is even more reliable with the use of a key which has a bar-code printed on its surface.

4 Claims, 22 Drawing Sheets

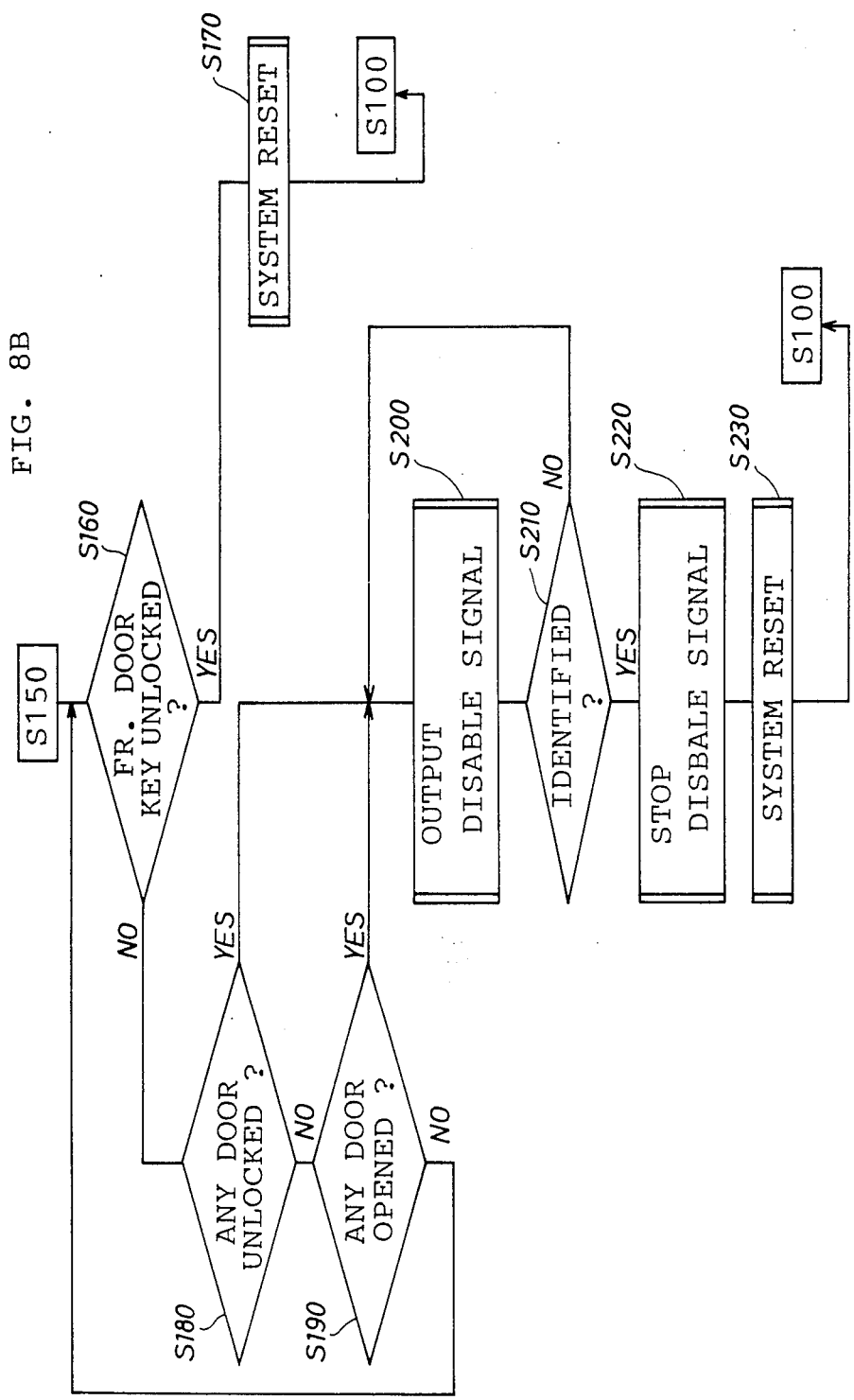

ANTI-THEFT DEVICE FOR AN AUTOMOBILE

BACKGROUND OF THE INVENTION

1. Field of the Invention

The present invention relates to an anti-theft device of an automobile for protecting the automobile from being stolen or from being intruded.

2. Prior Art

Various anti-theft devices for an automobile have been proposed. A first example is shown in Published Unexamined Japanese Utility Model Application No. Sho-58-86775 in which an anti-theft device operates on an independent exclusive battery prepared besides an ordinary main battery for the automobile. The anti-theft device remains powered and will work even if a cable from the main battery is cut from outside of the automobile through the front grill.

A second example is shown in Published Unexamined Japanese Patent Application No. Sho-58-35694 in which a memory circuit stores a locked state of the automobile and an alarm buzzer is activated when a door is opened by false measures despite the memorized locked state.

A third example is shown in Published Unexamined Japanese Patent Application No. Sho-59-45246 in which an alarm controller is connected to a memory circuit. An output data from the alarm controller is stored in the memory circuit so that a theft by a battery disconnection or after a battery has worn-out can be prevented.

Those are devices for alarming or preventing a false access to an automobile. Another type of anti-theft devices requires an identification of a driver to release a once locked condition and to start the engine. One such type is a device, a fourth example with a radio emitter. A driver holding the radio emitter can open the door since a receiver mounted on the automobile recognizes a special radio signal from the emitter.

Another example, a fifth example, of such type uses a special ignition key in which an electrical resistance of a particular resistance value is embedded. The resistance value of the inserted key is measured by the device to check whether it is an authentic key.

SUMMARY OF THE INVENTION

Every such anti-theft device has a blind-spot or a drawback. The first example cited above is still vulnerable when the separately prepared battery is located apart from the main functioning part of the anti-theft device. The second and the third examples are vulnerable to a cutting of a cable which connects the main battery of the automobile to the anti-theft device.

Furthermore, those anti-theft devices do not work when a spare ignition key or a counterfeited key is used to open the door and to start the engine. The radio emitter containing device in the fourth example rejects an authentic owner or driver when he fails to hold the emitter. It is a troublesome job for a driver to confirm if he is carrying the emitter besides the ignition key to start the engine. The emitter needs its own power source, or a battery. Therefore another troublesome job, i.e., a maintenance of the emitter, is required from the driver. In the worst case, he cannot enter the automobile when the battery of the emitter is not functioning. The resistance embedded key is hard to manufacture and the resistance value is hard to accurately control in manufacturing. The resistance changes depending on the environment temperature and humidity. It also changes according to the surface condition of the embedded resistance which is always changing according to the driver's handling. Therefore, a rather wide tolerance range of the resistance should be admitted for determining the authenticity of the key. Accordingly there can be only a small number of different keys, making the identification less reliable and the anti-theft system less secure.

An object of the invention is to make an anti-theft device more robust against tampering with a power source.

Another object of the invention is to provide a sure detector for a false intrusion and a battery disconnection offence.

Still another object of the invention is to provide an easy starting operation of the anti-theft device, or automatic starting of the device, with a normal locking operation of the doors and without any special identification device besides the ignition key.

Further object of the invention is to increase the reliability of the anti-theft device by making an ignition key unique among a large number of different keys with high precision of identification and with low cost.

The present invention is made in view of the above objects in which an anti-theft device for an automobile comprises:

intrusion detection means (M1, M11) for detecting an abnormal intrusion into the automobile and for generating an intrusion signal;

disable means (M4, M12) for prohibiting functioning of a control circuit (M3) of an engine of the automobile in response to the intrusion signal; and release means (M5) for halting the disable means (M4, M12) disabling the control circuit (M3) when input data to the release means (M5) are determined to be identical with preset data.

The anti-theft device may further comprise disconnection detection means (M2) for detecting a disconnection of a main battery of the automobile from electrical equipments and for generating a disconnection signal. In that case, the disable means (M4) prohibit functioning of the control circuit (M3) of the engine in response to at least one of the intrusion signal and the disconnection signal.

In the anti-theft device, the intrusion detection means (M1) may comprise a flip-flop circuit (36k) which generates the intrusion signal in response to a set signal from a door lock switch (36a) and door switches (36b, 36c, 36d, 36e) provided on every door of the automobile when one of the door switches detects an opening of the door while the door lock switch is still detecting a locked condition. Furthermore, the disconnection detection means (M2) may comprise a flip-flop circuit (38e) which generates the disconnection signal in response to a pulse signal from a Schmitt trigger circuit (38d) and a condenser (38c) when a main battery is disconnected from the condenser (38c).

Another anti-theft device for an automobile according to the invention comprises:

seat-vacant detection means (M21) for detecting that a seat of the automobile is vacant and for generating a seat-vacant signal;

wait means (M22) for counting a time from a time point when the seat-vacant signal is received and for generating a disable signal when a predetermined time interval has elapsed since the time point;

disable means (M23) for disabling the automobile in response to the disable signal; and release means (M24) for halting the disable means (M23) from disabling the automobile when input data to the release means (M24) are determined to be identical with preset data.

Still another anti-theft device for an automobile of the invention comprises:

release means (M31) for releasing the automobile to move;

lock means (M32) for halting the release means (M31) from releasing the automobile to move;

a bar-code (BC) printed on an ignition key (K) of the automobile;

a bar-code reader (M33) for reading the bar-code (BC) when the key (K) is operated to start the automobile and for generating a bar-code signal; and unlock means (M34) for unlocking the lock means (M32) halting the release means (M31) when the bar-code signal is determined to be identical with preset data.

Any anti-theft device according to the present invention as described above, may have a power source within itself for increasing its reliability.

BRIEF DESCRIPTION OF THE DRAWINGS

FIGS. 8A and 8B are flowcharts integrally describing a program of an anti-theft routine performed by the anti-theft ECU in the second embodiment.

DETAILED DESCRIPTION OF THE EMBODIMENTS

Figure 1:
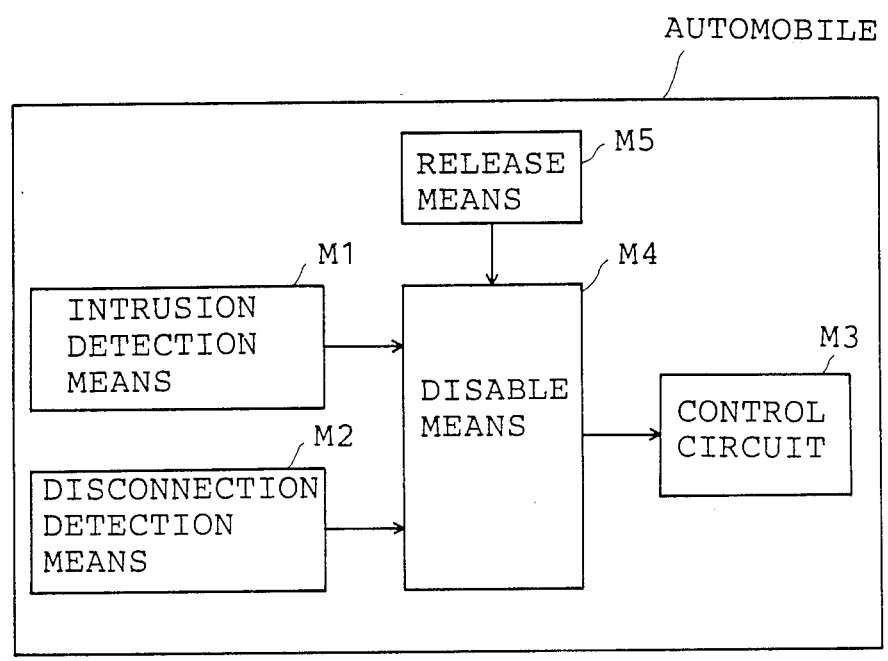
FIG. 1 is an explanatory block diagram indicating a principle structure of a first embodiment of the present invention.

FIG. 1 is an explanatory block diagram showing a principle structure of an anti-theft device for an automobile as a first embodiment of the invention. Intrusion detection means M1 detects a false intrusion into the automobile and disconnection detection means M2 detects a disconnection of the main battery of the automobile from the electrical equipments. The signals from the intrusion detection means M1 and the disconnection detection means M2 are transmitted to disable means M4. When the false intrusion signal or the disconnection signal is inputted, the disable means M4 disables a control circuit M3 for the engine of the automobile. The control circuit M3 then stops controlling, or disables, the engine. When an identification code is inputted from release means M5 by a driver, the release means M4 stops the disable means disabling the control circuit M3. The engine is then enabled.

Figure 2:
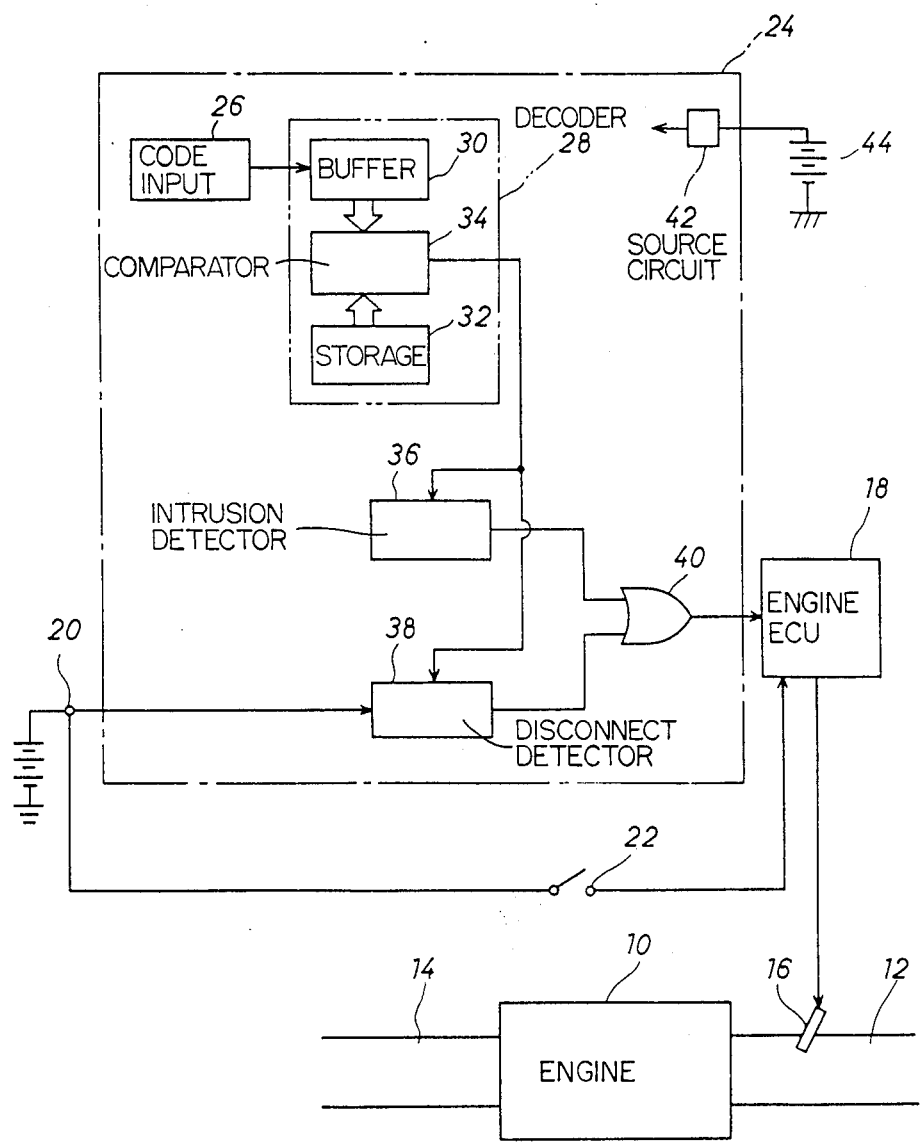
FIG. 2 is a circuit diagram of an anti-theft circuit according to the first embodiment.

FIG. 2 shows a detailed electrical block diagram of the anti-theft device of the first embodiment. In FIG. 2, an engine 10 is connected with an intake manifold 12 and an exhaust manifold 14. A fuel injector 16 is provided on the intake manifold 12 and is controlled by an engine control unit 18, which will be denoted as an engine ECU. The engine ECU 18 and an anti-theft circuit 24, whose details will be described later, are both powered by a main-battery 20. The engine ECU 18 is connected to the battery 20 via an ignition switch 22.

The anti-theft circuit 24 functions to halt the engine ECU 18 from controlling the injector 16 of the engine 10 when an abnormality is detected on the automobile. A code input circuit 26 receives a code inputted by a driver. The code input circuit 26 is equipped with a ten-key keyboard, which has 10 numeral keys not shown, and generates a different signal according to each pressed key. A decode circuit 28 decodes and identifies the key input data. The decode circuit 28 comprises a buffer 30, a storage 32 and a comparator 34. The input data from the code input circuit 26 is tentatively stored in the buffer 30 and is compared at the comparator 34 with a preset secret data stored in the storage 32. When the input data is identified with the present secret data, the comparator 34, or the decode circuit 28, generates a reset signal, or a "0" signal. The code input circuit 26 and the decode circuit 28 of this embodiment correspond to the release means M5 of FIG. 1.

An intrusion detection circuit 36, which corresponds to the intrusion detection means M1 of FIG. 1, generates a digital "1" signal when it detects a false intrusion into the automobile. An example of the detailed structure of this circuit is shown later. When there is no false intrusion, the circuit generates a digital "0" signal.

A disconnection detection circuit 38, which corresponds to the disconnection detection means M2 of FIG. 1, detects an electrical disconnection between the main battery 20 and electrical equipments on the automobile, e.g., demounting of the battery or cutting of a cable, and generates a digital signal "1". When the equipments are normally connected to the battery 20, this circuit 38 generates a digital "0" signal. An example of the disconnection detection means 38 will also be described later. An "OR logic" circuit 40 receives the digital signals from the intrusion detection circuit 36 and from the disconnection detection circuit 38 and outputs a logical signal. This signal is "1" when at least one of the two input signals is "1" and is "0" when both are "0".

The intrusion detection circuit 36 and the disconnection detection circuit 38 are reset by the reset signal of the decode circuit 28, i.e. each of the circuits 36 and 38 generates a "0" signal when the "0" signal is inputted from the decode circuit 28. The anti-theft circuit 24 has a source circuit 42, which is connected to an exclusive battery 44 that is different from the main battery 20.

Figure 3:
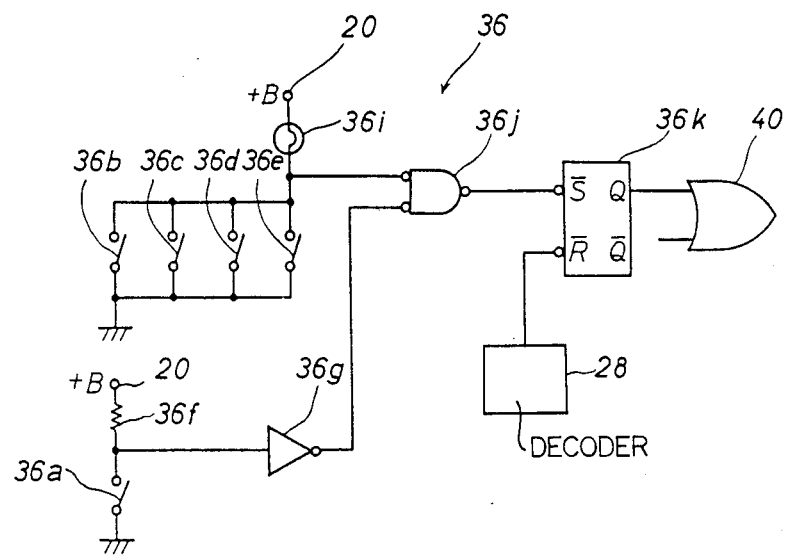
FIG. 3 is a detail circuit diagram of an intrusion detection circuit of the first embodiment.

The intrusion detection circuit 36 and the disconnection detection circuit 38 are then described. FIG. 3 shows a circuit diagram of the intrusion detection circuit 36, in which the circuit 36 consists of 5 switches 36a, 36b, 36c, 36d and 36e, a resistance 36f, a "NOT logic" circuit 36g, a courtesy lamp 36i, an "AND logic" circuit of negative-logic 36j and an RS flip-flop circuit of negative-logic 38k.

Each of the switches 36b through 36e, which are connected in parallel between the ground and the courtesy lamp 36i, is ON when a corresponding door is opened to light the courtesy lamp 36i which is placed between those door switches 36b through 36e and the battery 20. The negative-logic AND circuit 36j inputs a signal from a midpoint between the door switches 36b through 36e and the courtesy lamp 36i.

The door lock switch 36a, which connects the ground and the battery 20 via the resistance 36f, is OFF when all of the doors are locked. The NOT circuit inputs a signal from a midpoint between the door lock switch 36a and the resistance 36f and outputs a signal to the negative-logic AND circuit 36j.

The negative-logic AND circuit 36j inputs the signal from a midpoint between the door switches 36b through 36e and the courtesy lamp 36i. The circuit 36j also inputs the signal from a midpoint between the door lock switch 36a and the resistance 36f and outputs a signal to a set terminal S of the negative-logic RS flip-flop circuit 36k. A reset terminal R of the flip-flop circuit 36k is connected to the decode circuit 28. Once a "0" digital signal is inputted from the set terminal S, the flip-flop circuit 36k continues to output a "1" digital signal from its positive output terminal Q until a "0" signal is inputted from the reset terminal R. The output terminal Q is connected to an input terminal of the OR circuit 40.

The intrusion detection circuit 36 functions as follows. When a driver locks the doors for parking the automobile, the door lock switch 36a is OFF, making the input signal to the NOT circuit 36g high, or "1". The signal is reversed by the NOT circuit 36g to be "0" and inputted to the AND circuit 36j. When the doors are locked, the door switches 36b through 36e are OFF because, in a normal case, the doors are closed, making the other input signal to the AND circuit 36j high, or "1". As the input signals are "0" and "1", the output signal of the negative-logic AND circuit 36j is "1", which is inputted to the set terminal S of the flip-flop circuit 36k. Then the flip-flop circuit 36k outputs a "0" signal.

When the driver releases the door locks to drive the automobile when no tampering with the car has occurred, the door lock switch 36a is ON outputting a high level, or "1", signal to the AND circuit 36j. Since the other input of the AND signal is still "0", the output of the AND circuit 36j is "1" and the output of the flip-flop 36k remains "0". It enables the driver to drive the automobile normally.

When, on the other hand, a door is opened by some false measures while the doors are locked, the corresponding door switch is ON and a low level digital signal, i.e., a "0" signal, is inputted to the AND circuit 36j. Since the input from the NOT circuit 36g is still "0", a "0" signal is outputted to the set terminal S of the flip-flop circuit 36k. The flip-flop circuit 36k then outputs a digital signal of "1" from the output terminal Q as a result of the detection of an intrusion into the automobile by the intrusion detection circuit 36. The case indicates that a "1" digital signal is outputted from the intrusion detection circuit 36 in an abnormal state when one of the door switches 36b through 36e is ON while the door lock switch 36a is OFF.

After the automobile is disabled by setting the RS flip-flop circuit 36k, i.e., a "1" signal is outputted from the circuit 36k in response to the detection of the intrusion, an input of a preset identification number into the code input circuit 26 resets, via the decode circuit 28, the flip-flop 36k by inputting a "0" signal to the reset terminal R. Then the output from the terminal Q changes to "0" and the engine ECU 18 can work again.

A set flip-flop circuit can be placed between the door lock switch 36a and the NOT circuit 36g in the embodiment.

Figure 4:
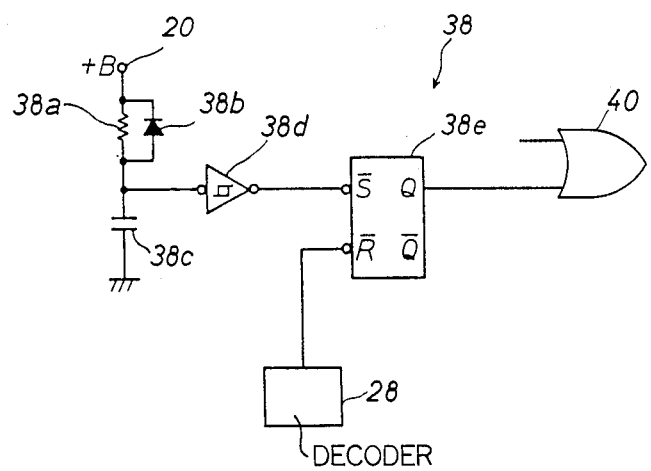
FIG. 4 is a detail circuit diagram of a disconnection detection circuit of the first embodiment.

Next an explanation of the disconnection circuit 38 is made according to FIG. 4. A resistance 38a and a diode 38b are connected in parallel to a condenser 38c, which are all placed between the battery 20 and ground potential. A Schmitt trigger circuit 38d is connected from the midpoint between the resistance 38a and the condenser 38c to a set terminal S of a negative-logic RS flip-flop circuit 38e. An output terminal Q of the flip-flop is connected to one of the input terminals of the OR circuit 40.

When the battery 20 is normally connected, the electricity of the battery is charged on the condenser 38c, making the input signal into the Schmitt trigger circuit 38d high. The Schmitt trigger circuit 38d, making a sharp digital signal and eliminating chatterings of the input signal, outputs a "1" digital signal to the flip-flop 38e. Then the flip-flop 38E is not set and a "0" digital signal is outputted from the output terminal Q to the OR circuit 40. That is a normal case in which the automobile is capable to move.

When the battery 20 is demounted or a cable from the battery 20 is cut by false measures, the condenser 38c is discharged, setting the flip-flop 38e. In this case, the engine 10 is disabled by the engine ECU 18. Even after the battery 20 is reconnected under this condition, the output of the flip-flop 38e is not reversed, i.e., remains "1", despite any input signal into the set terminal S. The engine 10 remains disabled until identification measures are taken at the code input circuit 26. When the identification is rightly made, a "1" signal is inputted into the reset terminal R and the output of the flip-flop 38e is changed to "0".

With such a structure, the anti-theft circuit 24 generates a digital "1" signal when someone tries to intrude into the automobile or to disconnect the battery 20.

Figure 5:
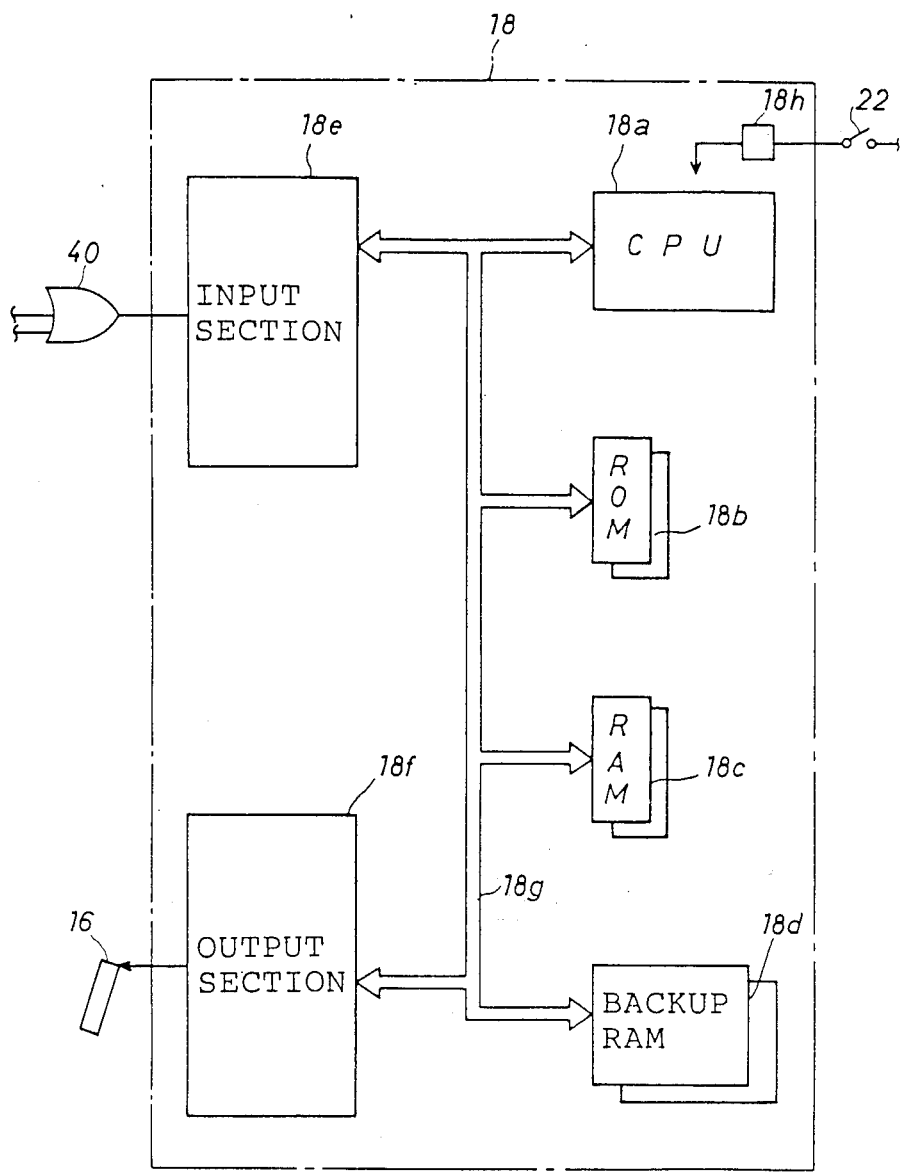
FIG. 5 is a block diagram of an anti-theft ECU of the first embodiment.

FIG. 5 shows a block diagram of the engine ECU 18 in which the following chips or circuits are provided. A central processing unit (CPU) 18a receives data from various sensors attached on the automobile, performs various calculations on the basis of preset control programs and generates data for controlling various actuators on the engine 10 including the fuel injector 16. A read only memory (ROM) 18b stores, in a nonvolatile manner, the control programs and other data necessary for controlling the engine 10 including a table for determining a fuel injecting duration. A random access memory (RAM) 18c temporarily stores input data and intermediate data in the course of the operation. A backup RAM 18d, backed up by the battery 20 but not through the ignition switch 22, keeps necessary control data for the engine 10 even when the ignition switch 22 is OFF. An input section 18e includes input ports, a wave-shaping circuit, a multiplexer and an A/D converter and inputs a digital signal from the OR circuit 40. An output section 18f includes output ports and a driver circuit for driving the fuel injector 16 to inject fuel into the engine 10 according to the control data from the CPU 18a. A bus line 18g which connects the CPU 18a, ROM 18b, the input section 18e, the output section 18f, etc. to one another and a source circuit 18h are also provided on the engine ECU 18.

The CPU 18a calculates an optimal fuel injecting timing and injecting duration for the engine 10 and the engine ECU 18 outputs a pulse data whose high state duration is the calculated injection duration of the fuel injector 16. When a digital signal "1" is inputted to the input section 18e of the engine ECU 18 from the OR circuit 40, a halt circuit (not shown) in the input section 18e prevents the input section 18e from transmitting various input data from outside to the CPU 18a. The engine ECU 18 therefore does not control, or disables, the engine 10.

In this embodiment, the anti-theft circuit 24 stops functioning of the engine ECU 18 when a door is opened while the doors are locked or when the battery 20 is disconnected by some false measures. Once the engine ECU 18 is disabled by a detection of such false measures, it cannot be enabled until the authentic owner or driver resets the anti-theft circuit 24 by inputting a secret code through the code input circuit 26, making a sure anti-theft system. When the driver wants to start the engine 10 while no tampering has occurred, he can promptly start without any special operation. Otherwise, he can determine that the automobile has been tampered with during his absence because the engine 10 is disabled. In such case, he can start the engine 10 with a simple input of the secret code into the ten keys of the code input circuit 26.

In the embodiment above, the intrusion detection circuit 36 utilizes a door lock switch 36a and the door switches 36b through 36e for detecting an intrusion. Also, other detectors may be used such as a detector utilizing a window glass embedded with a transparent electrode in which a break of the window glass is detected by a break of a current through the electrode, a detector utilizing a microphone or the like to catch a noise of the glass breaking, a detector for detecting a change in voltage of the battery 20 or a combination of them.

The code input circuit 26 may be replaced by a device for inputting an array of special characters, a magnetic card, a release switch hidden on the automobile or the like that can identify the authentic driver.

The engine ECU 18 may be replaced by a start control circuit for the starter motor of the engine 10, a control circuit for the transmission or the like which prevents the automobile from starting or moving.

The door lock may be an automatic type which does not require the intentional locking operation.

Figure 6:
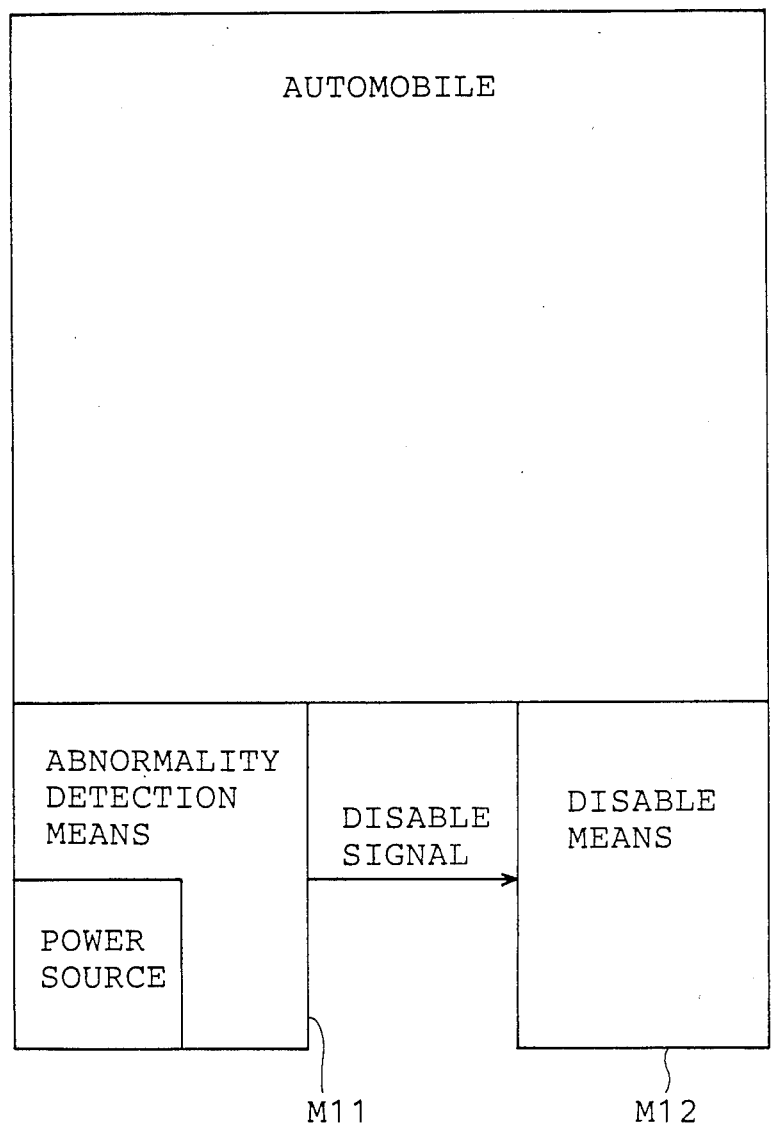
FIG. 6 is an explanatory block diagram indicating a principle structure of a second embodiment of the present invention.

Another embodiment of the invention is then explained. FIG. 6 shows a principle structure of the embodiment. In this embodiment, an abnormality detection means M11 is provided on an automobile. The abnormality detection means M11 has an exclusive power source of its own within itself. When an abnormality, e.g., an intrusion into the automobile, occurs, a disable signal is genrated in the abnormality detection means M11 and transmitted to a disable means M12 which is also provided on the automobile and disables the automobile in response to the disable signal.

Figure 7:
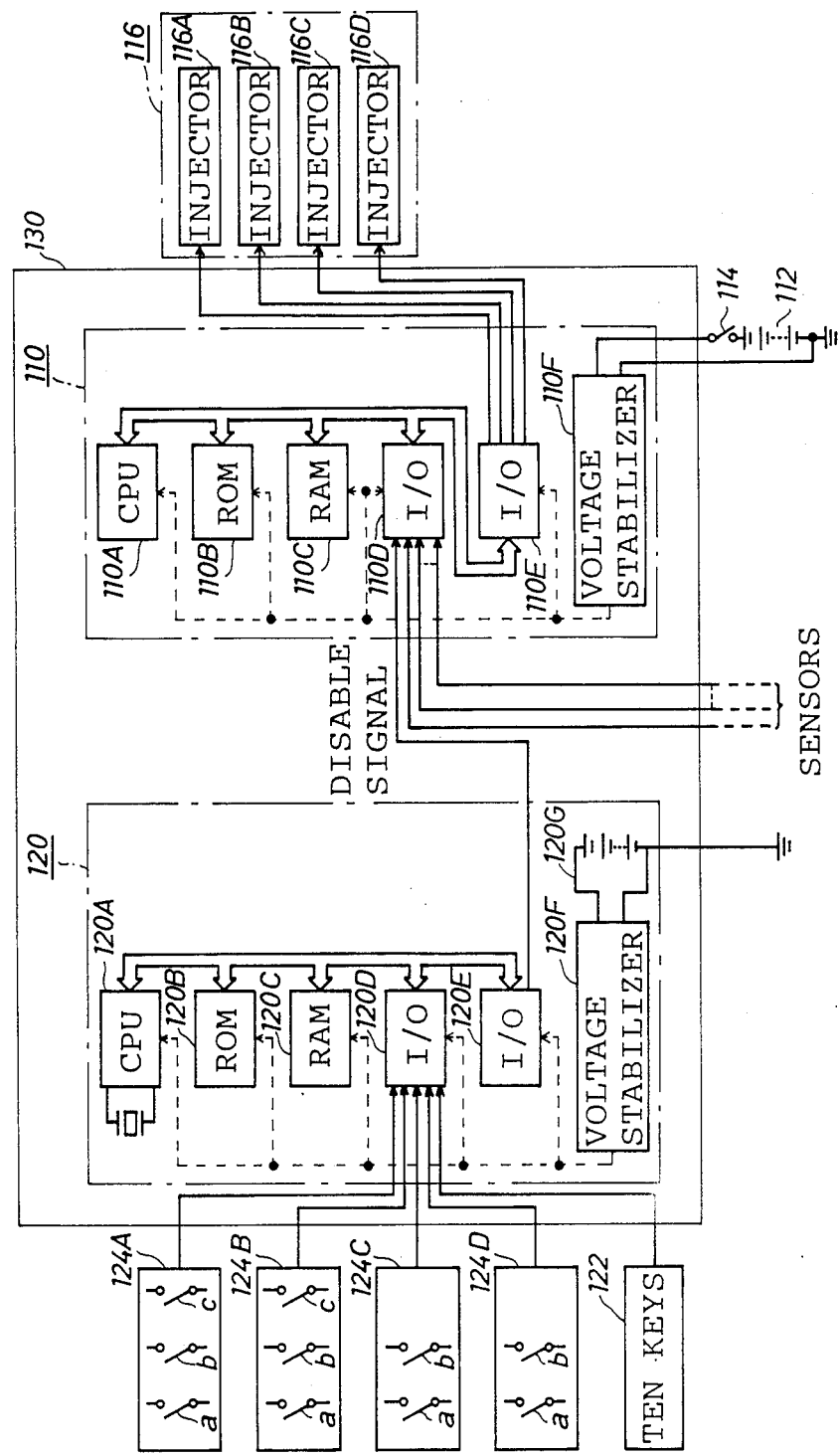
FIG. 7 is a circuit diagram of an anti-theft ECU and an EFI ECU of the second embodiment.

Detailed structure and operations of the embodiments are explained according to FIG. 7 which is a block diagram of a control circuit of an automobile including an anti-theft circuit. A first electronic control unit, ECU, 110, corresponding to the disable means M12 of FIG. 6, is provided for controlling the engine of the automobile including a CPU 110A for operating various calculations, a ROM 110B for storing control programs and necessary data, a RAM 110C as a tentative storage and two I/O ports 110D and 110E for exchanging data with outside peripheral devices. Those elements are powered by a main battery 112 of the automobile via an ignition switch 114 and a voltage stabilizer 110F.

The I/O port 110D is connected to sensors attached on various sites of the automobile to detect current driving conditions and engine conditions. The other I/O port 110E outputs an injection signal to fuel injectors 116 according to the result of the optimal injecting timing and injecting duration calculated by the CPU 110A. The engine is a 4-cylinder type and has 4 injectors 116A through 116D in this embodiment.

A second ECU 120, corresponding to the abnormality detection means M11 of FIG. 6, is provided for controlling anti-theft functions on the same board 130 as the first ECU 110. It also includes a CPU 120A, a ROM 120B, a RAM 120C, two I/O ports 120D and 120E and a voltage stabilizer 120F. The second ECU 120 is not supplied with power from the main battery 112 as the first ECU 110 is, but it is supplied from an exclusive battery 120G mounted on the same board as the ECUs 110 and 120. So the second ECU 120 is independently operable even when the ignition switch 114 is turned off or when the cable from the main battery 112 is cut.

The I/O port 120D of the second ECU 120 is connected to a ten-key keyboard 122 which is provided at a panel in front of the driver's seat for the driver to release the disabled engine. The I/O port 120D is also connected to 4 switch boxes 124A, 124B, 124C and 124D each of which is provided in each door of the automobile. The other I/O port 120E of the second ECU 120 outputs a disable signal to the I/O port 110D of the first ECU 110.

Each of the switch boxes 124A through 124D is constructed from a courtesy lamp switch (a) and a door lock switch (b). A key switch (c) is provided only in the switch boxes 124A and 124B of the front doors. The courtesy lamp switch (a) is ON for lighting all courtesy lamps when the door is opened and is OFF when the door is closed. The door lock switch (b) is ON when the door is locked and is OFF when the door is unlocked.

The key switch (c) is ON when a key is operated for locking or unlocking the door and is OFF otherwise.

Figure 8A:
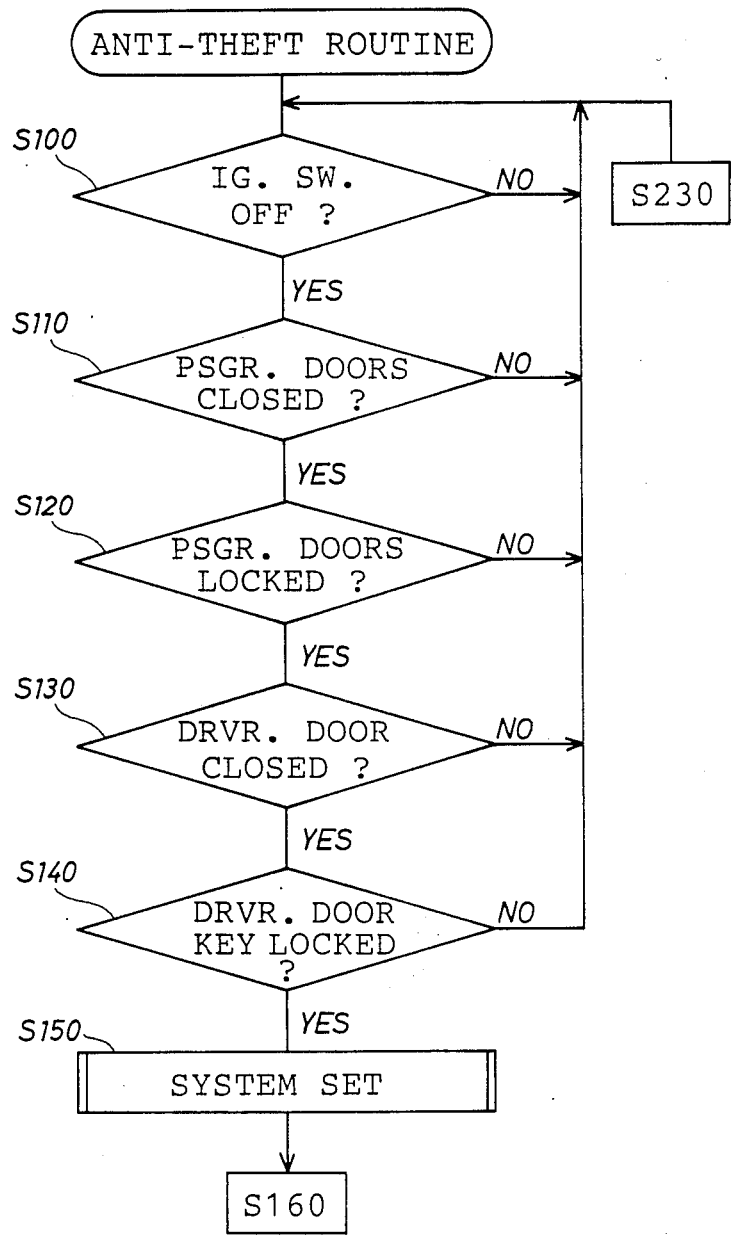

The CPU 120A of the anti-theft device of the present embodiment is operated according to a control program of an anti-theft routine whose flowcharts are shown in FIGS. 8A and 8B.

When the routine is started, steps S100 through S140 are executed for determining whether there is a condition for outputting a disable signal, i.e., whether the automobile is parked and the driver has gotten off. At step S100, it is determined whether or not the ignition switch 114 is OFF to determine whether or not the engine is not running. At step S110, it is determined whether or not all the doors but the driver's are closed. It is done by detecting that corresponding courtesy lamp switches (a) of the switch boxes 124B, 124C and 124D are OFF. When the result is YES at step S110, then, at step S120, it is determined whether or not the door lock switches (b) of the doors but the driver's are ON, i.e., the doors are locked. At step S130, it is determined whether or not the driver's door is closed by detecting that the door lock switch (b) is ON. At step S140, it is determined whether or not the driver's door is locked by operating the key of the automobile by detecting that both the key switch (c) and the door lock switch (b) of the switch box 124A are ON.

When it is determined, at the 5 determination steps S100 through S140, that all the doors are closed, all the doors but the driver's are locked and the driver's door is locked by the key, the next step S150 is executed. When at least one of the conditions is not satisfied, the process step is returned to step S100 to again execute detections.

When all the conditions are satisfied, it is determined that the automobile is parked and at step S150, a system set for the anti-theft device is executed, i.e., a flag for memorizing that the automobile is parked is set and all parts of the anti-theft device start operating. Until that time, only such parts relevant to the determination of steps S100 through S140 are operating. Then it is determined whether the lock of either of the front doors is released by the key at step S160. When the driver returns to the automobile and unlocks a front door with the key, the result of step S160 is YES and the process step proceeds to step S170, where the system is reset, i.e., the flag is set to memorize that the automobile is not parked and the parts of the anti-theft device have stopped operating. Then the process step returns to step S100 to repeat the routine.

When the unlocking by the key is not executed during the set condition, step S180 and the steps subsequent thereto are executed. Steps S180 and S190 are for determining whether or not the automobile is being tampered with. At step S180 it is determined whether or not any of the 4 doors is unlocked and at step S190 it is determined whether or not any of the 4 doors is opened despite the locked condition. When it is determined that a door is unlocked or a door is opened without unlocking it, step S200 is executed and otherwise step S160 is executed again.

At step S200, when it is determined that the automobile is being tampered with, a disable signal is transmitted from the I/O port 120E to the I/O port 110D. The first ECU 110 stops outputting the injection signal from the I/O port 110E to the injectors 116 in response to the disable signal inputted into the I/O port 110D. Therefore, the automobile cannot be driven because no fuel is supplied to the engine.

Then at the next step S210, it is determined whether or not an input signal from the keyboard 122 is identical with a preset secret code signal stored in the ROM 120B. If the input signal is not identical to the secret code or if no input signal is transmitted from the keyboard 122, step S200 is executed again to keep outputting the disable signal. When the identification is done at step S210, the disable signal stops outputting at step S220 and the system is reset at step S230. Then the process step returns to step S100 to repeat the routine.

In the present embodiment constructed and operated as above, the second ECU 120 and the steps S100 through S140 correspond to the intrusion detection means of the invention, the second ECU 120, the first ECU 110 and the step S200 correspond to the disable means and the keyboard 122, the second ECU 120, the steps S210 through S230 correspond to the release means. The exclusive battery 120G is the exclusive power source for the anti-theft device.

Since in the present embodiment an exclusive battery 120G is provided independently from the main battery 112 of the automobile, the anti-theft device can work even if the cable from the main battery is cut from outside the front grill. The disable signal from the I/O port 120E is kept outputting in that case. It is still advantageous that an erroneous functioning of the anti-theft device is prevented when the main battery 112 is dismounted from the chassis during servicing. This will not cause the engine to be disabled during servicing. The exclusive battery 120G is placed on the same board as the ECUs 110, 120 so that it is impossible to disconnect the power source from outside. The two ECUs 110, 120 for controlling the engine and the anti-theft device respectively are placed on the same board so that the disable signal cannot be prevented from being transmitted to the engine control system. It is also an advantage of the present embodiment for keeping the reliability of the anti-theft device.

Most parts of the anti-theft device are not operated until when the system is set by determining that the automobile is parked, for saving the limited capacity of the exclusive battery 120G. The system set is done only after the driver's door is locked by the key, eliminating the possibility that the key is left inside of the locked cabin by the driver and the anti-theft system functions against the driver's effort to open the door. The system is easy to set since it is set only by the driver's normal key operation to lock the door and easy to reset since it is reset only by his normal key operation to unlock the door if there is no false measures against the automobile when it is parked. When false measures are made, the driver can easily know that and needs only a simple operation on the keyboard 122 to reset the system and to restart the engine.

Figure 9:
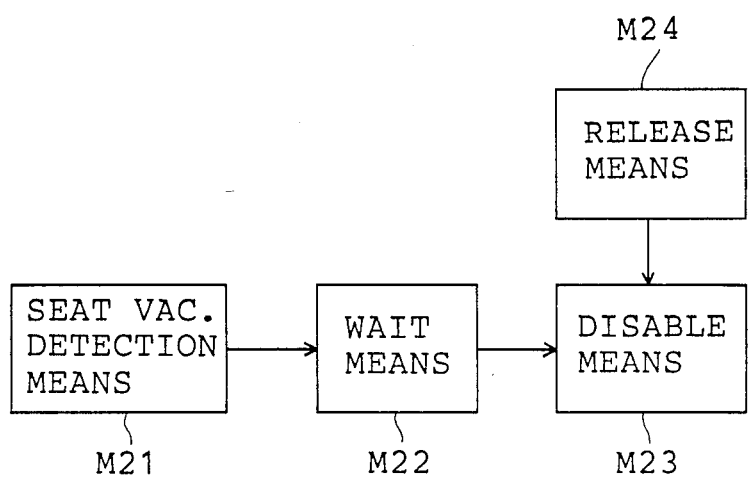
FIG. 9 is an explanatory block diagram indicating a principle structure of a third embodiment of the present invention.

A third embodiment of the invention is explained in brief with reference to FIG. 9 which shows a principle structure of the embodiment. Seat vacant detection means M21 of an automobile generate a seat vacant signal when they detect that all passengers have gotten off the automobile. Wait means M22 start counting a time from receiving the seat vacant signal and determine whether a preset time period has elapsed since then. When the time period has elapsed, the wait means M22 generate a disable signal to disable means M23, while disable the automobile from moving in response to the disable signal. Release means M24 generate a release signal when an identification code is inputted by a driver to release the disable means M23 disabling the automobile.

A detailed structure of this embodiment is explained with reference to FIG. 10. An anti-theft computer, or an anti-theft ECU, 220, which corresponds to the seat vacant detection means M21, the wait means M22 and the release means M24, and an electronic fuel injection computer, or an EFI ECU, 250, which corresponds to the disable means M23, are powered by a main battery 211 on the automobile via a fuse 212. The anti-theft ECU 220 is also powered by the main battery 211 via a fuse 213 and an ignition switch 214.

The EFI ECU 250 receives, as is well-known, signals from sensors attached on various sites on the automobile to detect the current driving condition and calculates optimum injection duration according to the condition to control fuel injectors 260 on the engine. The EFI ECU 250 also receives signals 221 and 222 from the anti-theft ECU 220. When it receives the signal 221, the EFI ECU 250 stops controlling the fuel injectors 260, therefore disabling the engine. It is the disable signal. When the EFI ECU 250 receives the signal 222, the EFI ECU 250 is released and resumes control of the injectors 260, therefore enabling the engine. It is the release signal.

Figure 10:
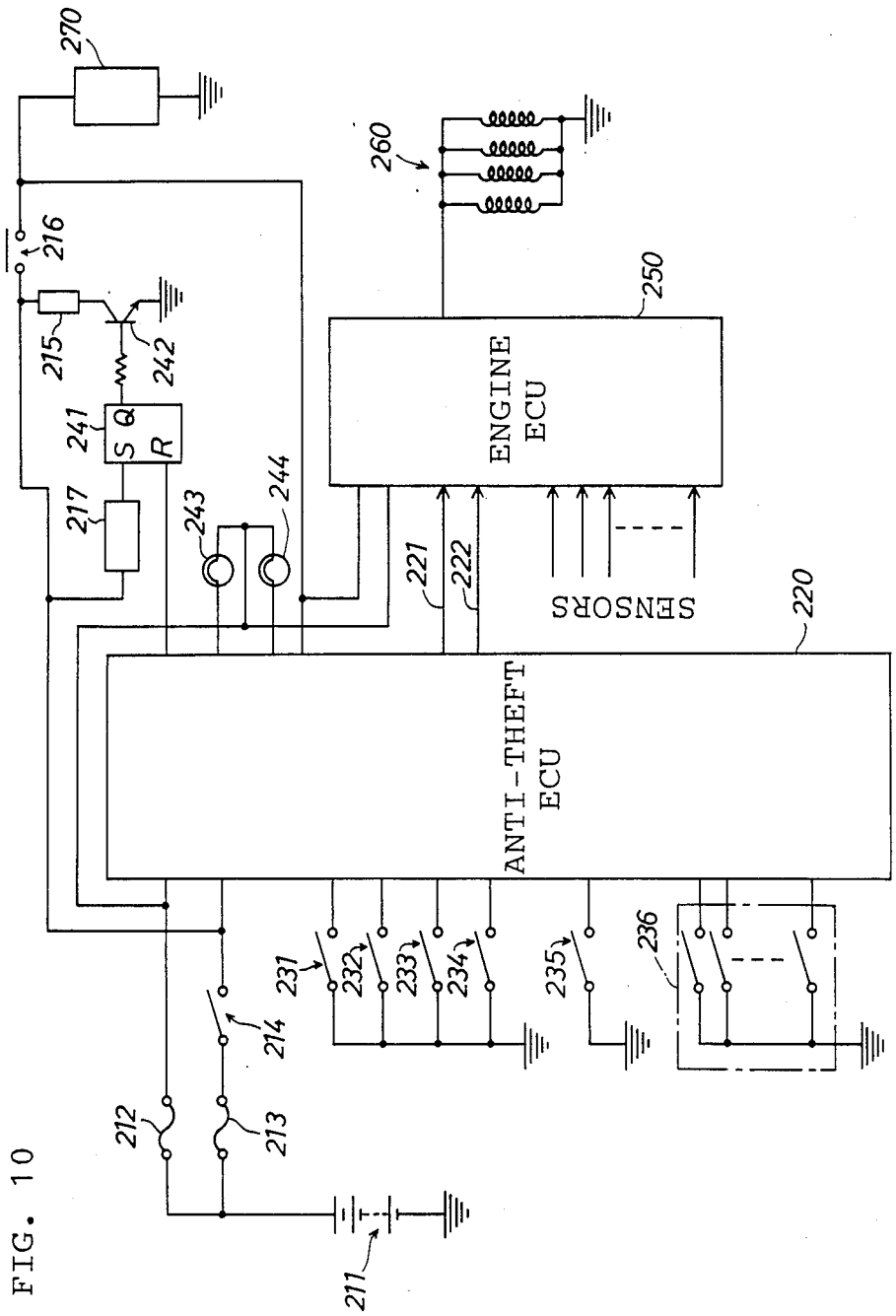
FIG. 10 is a block diagram of an anti-theft device of the third embodiment.

The anti-theft ECU 220 receives signals from 4 seat switches 231, 232, 233 and 234, each attached to each passenger seat including the driver's seat and a door switch 235, which is provided in each door but only one is shown in FIG. 10. With these switches and a following processing program, the anti-theft ECU 220 determines that the passengers have gotten off the automobile. Signals from switches on a ten-key keyboard 236 are also inputted into the anti-theft ECU 220. An identification code is inputted by means of the keyboard 236 by the driver. A door lock switch (not shown in FIG. 10) is provided on each door and a signal from the door lock switch is also inputted into the anti-theft ECU 220.

The anti-theft ECU 220 controls lighting of two warning lamps 243 and 244 and sends a reset signal to a flip-flop 241. The flip-flop 241 receives a set signal from a one-shot circuit 217 and outputs a signal to the base terminal of a switching transistor 242 of NPN type. The one-shot circuit 217 is connected to the ignition switch 214. When the ignition switch 214 is closed, i.e., made ON, the one-shot circuit 217 generates a pulse signal of a short period. The collector terminal of the transistor 242 is connected to the battery 211 via a relay 215 and the emitter terminal is connected to the ground. The relay 215 is for switching the contact switch 216. When the relay 215 is ON, the switch 216 is ON and vice versa. The switch 216 connects an ignition device 270 to the battery 211 via the ignition switch 214. A signal from the switch 216 is inputted into the anti-theft ECU 220 and the EFI ECU 250 as an ignition signal.

The anti-theft ECU 220 consists of a microcomputer and some peripheries which are not shown in FIG. 10. The microcomputer is supplied with power independently of the ON/OFF state of the ignition switch 214 and functions according to a preset program. The abstract of the program is as follows. First, it is determined whether all the passengers including the driver have gotten off the automobile utilizing the seat switches 231 through 234 and the door switch 235. After a preset time interval has elapsed since they got off, the anti-theft ECU 220 sends the signal 221 to the EFI ECU 250 to disable the control operation of the ECU 250 which stops controlling the injectors 260 and disables the engine. It provides effective measures for preventing the automobile from being stolen. When an identification secret code is inputted from the keyboard 236 by the driver, the anti-theft ECU 220 outputs the release signal 222 to the EFI ECU 250 to enable it to control the injectors 260.

Figure 11A:
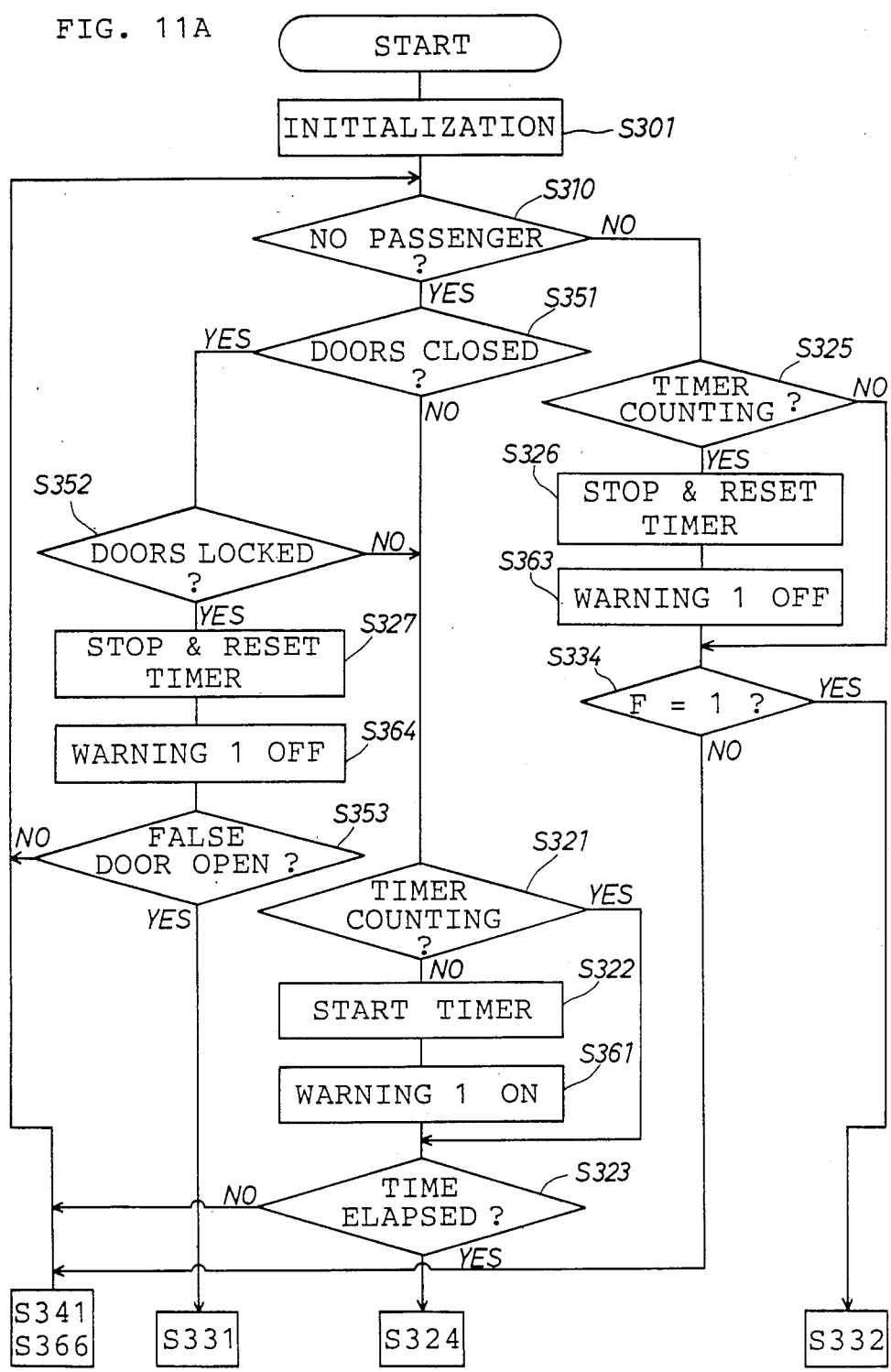
FIGS. 11A and 11B are flowcharts integrally describing a program of a routine performed by an anti-theft ECU of the third embodiment.
Figure 11B:
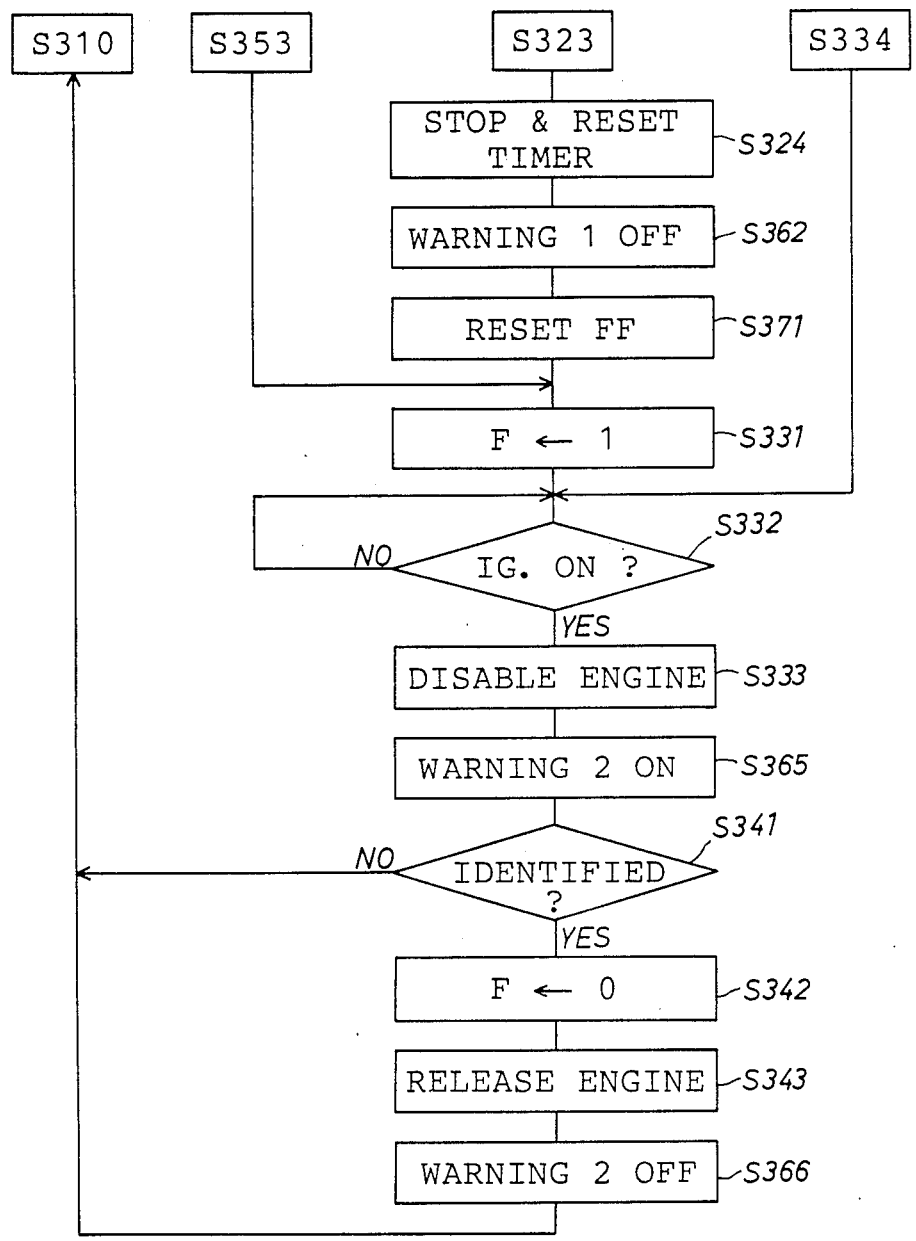

FIGS. 11A and 11B are flowcharts of the program for the anti-theft routine. The routine starts when the anti-theft ECU 220 is connected to the battery 211 via the fuse 212 independently of the ON/OFF state of the ignition switch 214. At step S301, a well-known initialization for the computer is executed. At the next step S310, it is determined whether or not all the passengers have gotten off the automobile on the basis of the signals from the seat switches 231 through 234.

If a passenger is still on a seat and the determination result is NO at step S310, it is then determined at step S325 whether or not a timer, which is described later, is counting. As the timer is not yet counting, the result is NO at step S325 and it is determined at step S334 whether or not a flag F is in a set state, which is explained later. Since the flag F is not yet set, the result is NO at step S334 and the process step returns to step S310. Those are explanations of a case when a passenger is still on a seat and steps S310, S325 and S334 are repeatedly executed. The anti-theft ECU 220 does not output any signal since it is not activated yet.

When all the passengers leave the seats, the result of the determination at step S310 is YES, and then it is determined at step S351 whether or not each door is closed on the basis of the signals from the door switch 235. If a door is not closed, it is then determined at step S321 whether or not the timer is counting. Since the timer is not counting yet it is started at step S322. This timer is a so-called soft timer which counts time by counting the number of clock signals generated in a clock circuit of the anti-theft ECU 220. Then at step S361, a warning 1 is turned ON, i.e., the warning lamp 243 is lighted and a warning saying "The engine will be disabled after T minutes!" is displayed on the dashboard.

At the next step S323, it is determined whether or not a preset time has elapsed on the basis of the timer. If the time has not elapsed, the process step returns to step S310. When there is no change in the conditions, the determination result at step S310 is again YES, that at step S351 it is NO and step S321 is executed. As the timer, in this case, is counting the determination result at step S321 is YES, steps S322 and S361 are skipped and step S323 is executed. Steps S310, S351, S321 and S323 are repeatedly executed until the time elapses.

When the door is closed before the time elapses, the determination result at step S351 is YES and step S352 is executed, where it is determined whether the doors are locked. If a door is not locked, step S321 is executed and steps S310, S351, S352, S321 and S323 are repeatedly executed. If the doors are locked, step S327 is executed, where the timer stops counting and is reset, i.e., the value of the timer is set to 0. Then, at step S364, warning 1 is OFF, i.e., the warning lamp 243 is turned OFF and, at step S353, it is determined whether or not a door is falsely opened, i.e., a door lock is released without the key and a door is opened. It is to determined whether the automobile is being broken into. If the door is not falsely opened, the anti-theft ECU 220 executes steps S310, S351, S352, S327, S364 and S353 repeatedly while the car is parked, otherwise the determination result at step S353 is YES and the engine is prevented from starting as described later.

When a passenger returns to the automobile and gets in a seat, the determination result is NO at step S310 and step S325 is executed. The timer stops counting and is reset at step S326 and the warning 1 is turned OFF at step S363. As the determination result at step S334 is NO this time, steps S310, S325 and S334 are repeatedly executed, as explained earlier.

When all the passengers leave the automobile without closing a door or without locking it, the determination result at step S310 is YES, that at step S351 or at step S352 is NO and step S321 is executed. Then the timer starts counting at step S322 and steps S310, S352 (or S352), S321 and S323 are repeatedly executed until the preset time elapses. When the time elapses, the determination result is YES at step S323 and step S324 and the subsequent steps thereto are executed.

At step S324, the timer stops counting and is reset to 0 and, at step S362, the warning 1 is turned OFF. At step S371, a reset signal is outputted to the flip-flop (FF) 241.

When the ignition switch 214 is turned ON and the one-shot circuit 217 generates the corresponding pulse signal and the flip-flop 241 is set, thereby turning the transistor 242 ON and turning the switch 216 of the relay 215 ON. When the reset signal is inputted into the flip-flop 241, the transistor 242 is turned OFF, making the switch 216 of the relay 215 OFF. Thus, when the passengers leave the automobile with the engine running, the switch 216 is turned OFF by the execution of step S371, cutting a power supply to the ignition device 270 and the EFI ECU 250. The engine is then disabled. At step S331, the flag F is set to "1", which memories that the engine is disabled.

When the ignition switch 214 is turned ON after the preset time has elapsed since the passengers left the automobile, the flip-flop 241 is set by a pulse signal from the one-shot circuit, 217, the transistor 242 is ON and the switch 216 of the relay 215 is ON. At step S332, it is determined whether or not the switch 216 is ON and the ignition device 270 and EFI ECU 250 is powered by the battery 211 via the ignition switch 214. Until the switch 216 is ON, this step is repeatedly executed. When the ignition switch 214 is turned ON by using the key of the automobile or by some false measures, the determination result at step S332 is YES and a disable signal 221 is outputted from the anti-theft ECU 220 to the EFI ECU 250 at step S333. So the EFI ECU 250 does not work and the engine cannot be started even if the ignition switch 214 and the switch 216 are ON. Then at step S365, a warning 2 is turned ON, i.e., the warning lamp 244 is lit and a message "The engine is disabled. Input the identification." is displayed on the dashboard. The next step S341 is for determining whether ot not the identification is made. The identification is made by inputting a preset secret code into the keyboard 236. Unless the identification is rightly made, step S310 is executed next and the right identification is waited with the following processing steps. The determination result at step S310 is NO as someone is operating the keyboard 236 on a seat. The result at step S325 is also NO as the timer is not yet counting and the result at step S334 is YES as the flag F is set. Consequently, the steps S310, S325, S334, S332, S333, S365 and S341 are repeatedly executed until a right identification is made.

When a right identification is made, the flag F is reset at step S342, a release signal 222 is outputted to the EFI ECU 250 at step S343 and the warning 2 is made OFF at step S366. Then the engine can be started. After that, the anti-theft ECU 220 executes steps S310, S325 and S334 repeatedly.

The embodiment is made in a way that the disable signal 221 is transmitted from the anti-theft ECU 220 to the EFI ECU 250 after the preset time interval has elapsed since all the passengers have left the automobile with a door opened or with doors closed but unlocked. Therefore the automobile is disabled and is prevented from being stolen. The preset time interval is set, for example, at around 5 or 10 minutes. After the engine is disabled, it is enabled by inputting the preset secret code.

When the doors are locked after the passengers have left the automobile, the engine is not disabled after the preset time interval. A driver does not need to input the secret code from the keyboard 236 after returning to the automobile to start the engine if the automobile was not tampered with during his absence. Of course, if there was tampering with the automobile under that condition, the engine is disabled to prevent the automobile from being stolen.

It is to note that an exclusive battery is provided within the anti-theft ECU 220 (not shown in FIG. 10) as a power source in itself, assuring its functioning when the cable from the main battery 211 to the ECU 220 is cut.

Figure 12A:
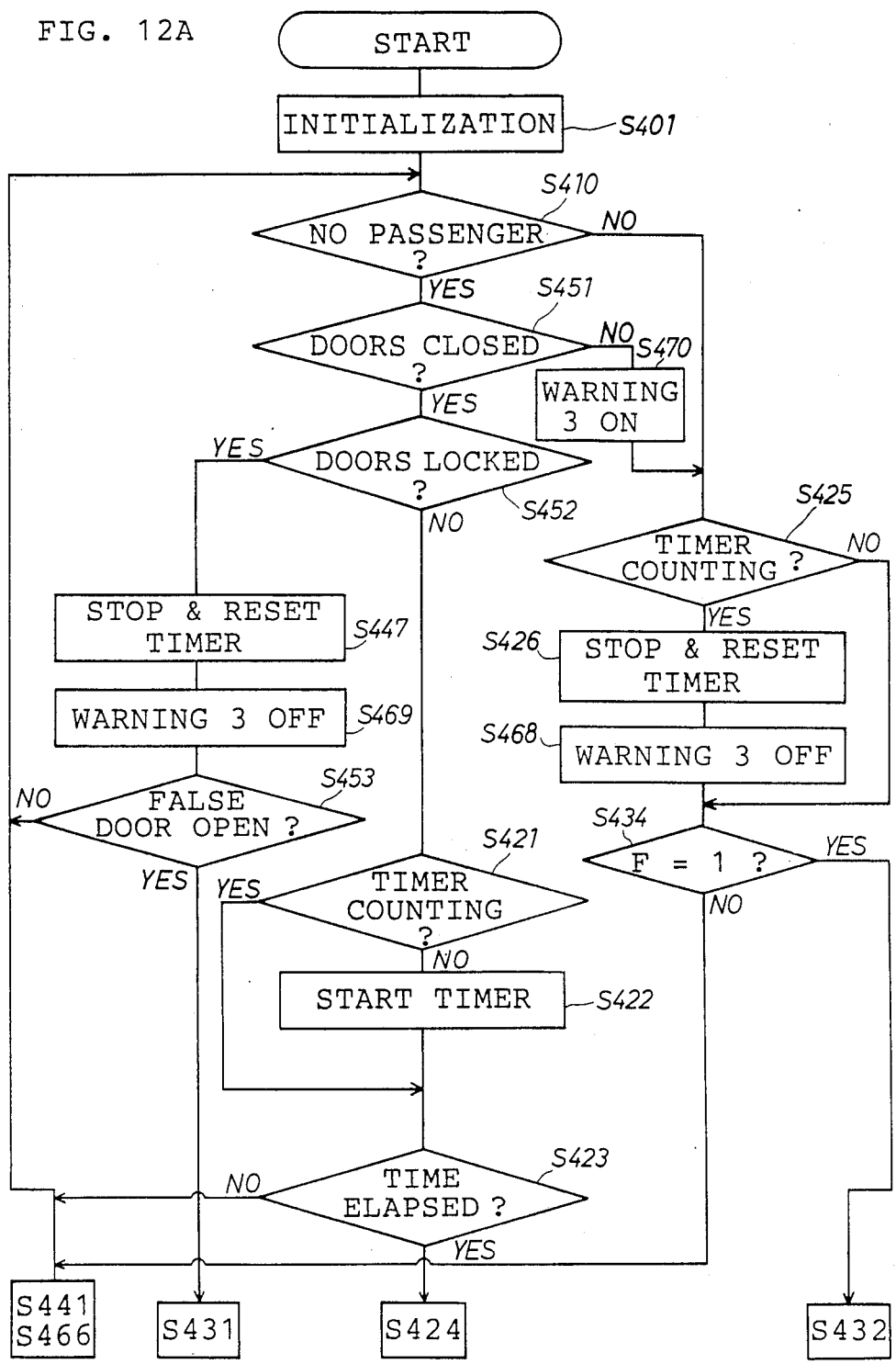
FIGS. 12A and 12B are flowcharts integrally describing another program of a routine also performed by the anti-theft ECU of the third embodiment.
Figure 12B:
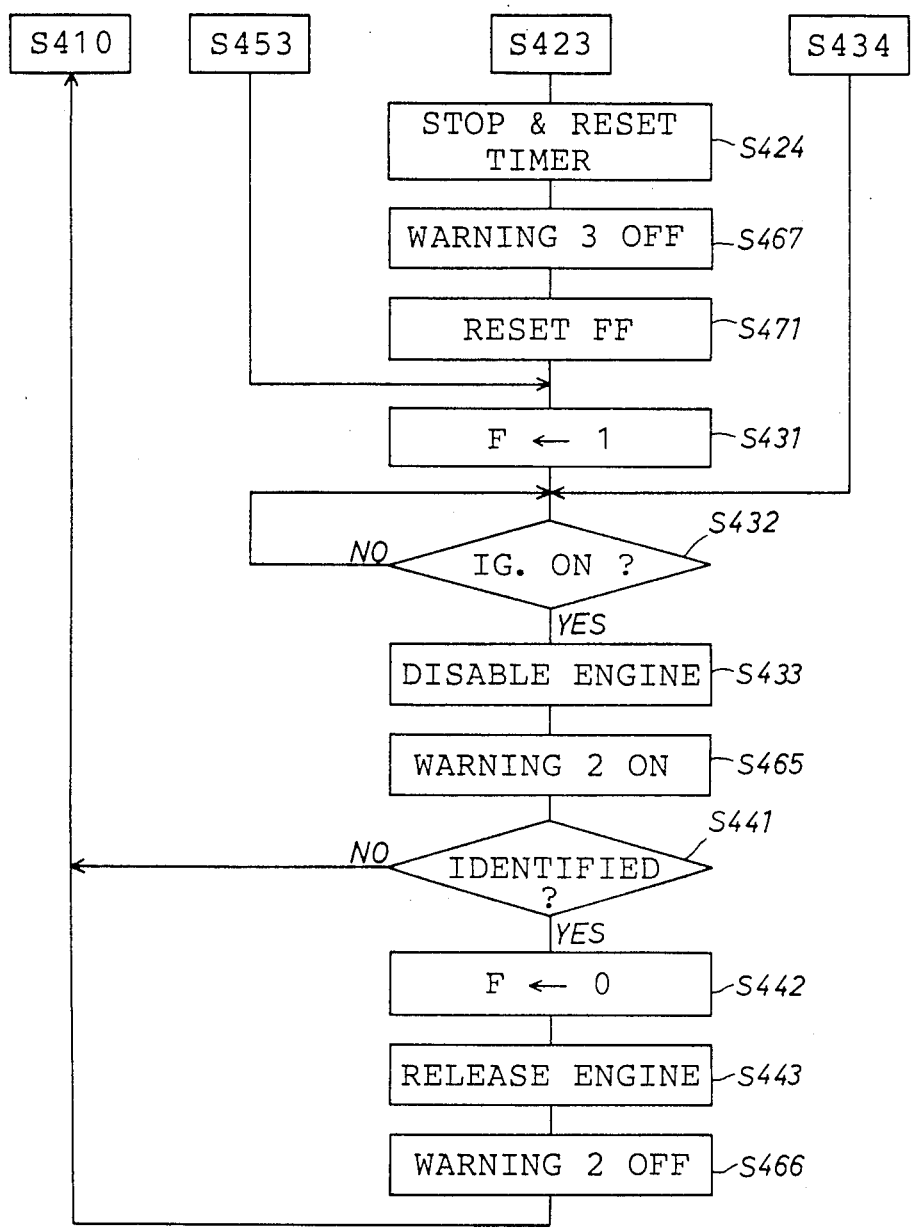

FIGS. 12A and 12B are flowcharts that are slightly changed from FIGS. 11A and 11B. The flowcharts are for a program of a routine executed by the anti-theft ECU 220, in which the disabling of the engine is done after a preset time interval since the passengers get off the automobile and the driver's door is closed. In this program, the engine is not disabled after the preset time interval if a door is opened. The program is prepared because it is inconvenient for a driver to release the anti-theft ECU 220 to restart the engine even if he is out of the automobile. In that case, the engine cannot be disabled by opening the driver's door. In FIGS. 12A and 12B, the processing steps are numbered with the same last two digits as the corresponding steps of FIGS. 11A and 11B.

At step S410, it is determined whether or not the passengers have gotten off the seat. When they are out of the seat, the determination result at step S410 is YES and then it is determined at step S451 whether or not the doors are closed. When they are not closed, the result at step S451 is NO and the process step does not proceed to steps S422 and after, preventing the timer from starting to count. In that case, i.e., the result at step S451 is NO, a warning 3 is turned ON at step S470, displaying the message "If the door is closed, the engine will be disabled in T minutes." on the dashboard. Therefore, when the driver leaves the seat but does not close the door, steps S410, S451, S470, S425 and S434 are repeatedly executed.

When the doors are closed in that condition, the result at step S451 is YES and it is determined at step S452 whether or not the doors are locked. If the doors are not locked, the timer starts counting and, after the preset time interval, the engine is disabled as in the case of FIGS. 11A and 11B by the process of steps S421, S422 and the steps subsequent thereto. If the doors are locked, the result at step S452 is YES and the engine is disabled when a door is opened falsely without the key, as in the case of FIGS. 11A and 11B. Steps S467, S468 and S469 in FIGS. 12A and 12B are for turning the warning 3 OFF.

The processes at step S310 in FIG. 11A and step S410 in FIG. 12A correspond to the seat vacant detection means M21 in FIG. 9. Those at steps S321 through S327 in FIGS. 11A and 11B and at steps S421 through S427 in FIGS. 12A and 12B correspond to the wait means M22 in FIG. 9. Those at steps S331, S332, S333 and S334 in FIGS. 11A and 11B and at steps S431, S432, S433 and S434 in FIGS. 12A and 12B correspond to the release means M24 in FIG. 9. Those at steps S341, S342 and S343 in FIGS. 11A and 11B and at steps S441, S442 and S443 in FIGS. 12A and 12B correspond to the disable means M23 in FIG. 9.

In the above embodiment, the seat vacant detection means M21 may be alternatively realized by an ultrasonic detector. The disable means M23 may be such that it prevents the transmission from being shifted to a driving range. The identification secret code for the release means M24 may be replaced by an ignition key with a bar-code printed on its surface, which will be explained later.

Figure 13:
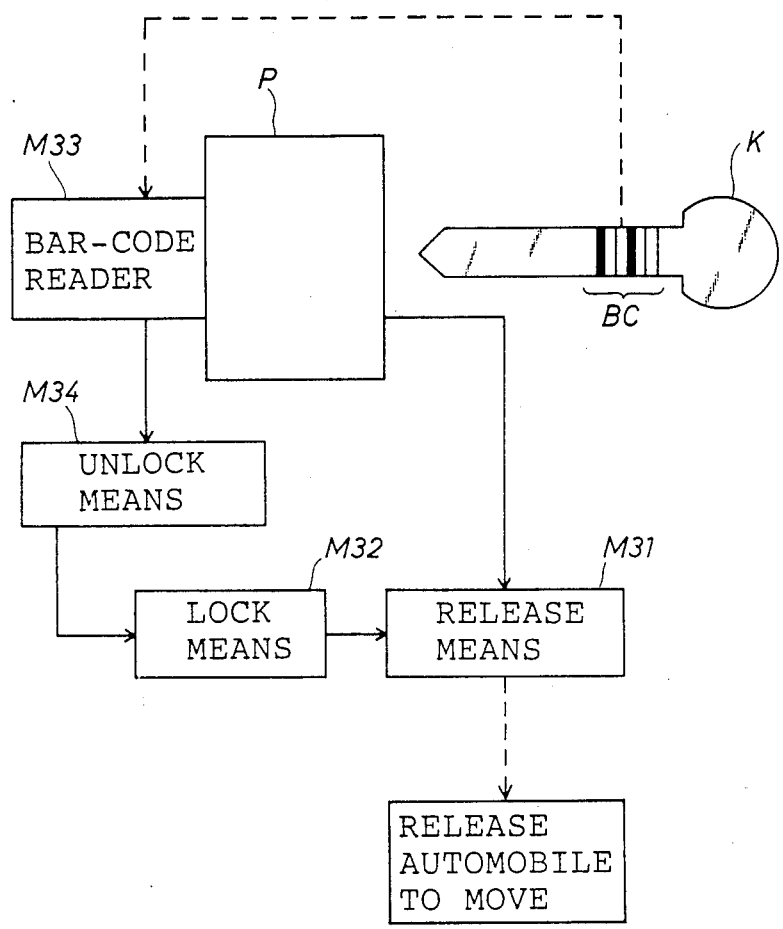
FIG. 13 is an explanatory block diagram of embodiments of a fourth embodiment of the present invention.

A fourth and a fifth embodiment of the invention are then explained. A principle structure of these embodiments is illustrated in FIG. 13. When an ignition key K with a bar-code BC is inserted into the key cylinder P and is being operated to start the engine of an automobile, a bar-code reader M33 provided in the key cylinder P reads the bar-code BC on the ignition key K. The bar-code reader M33 generates a signal responsive to the bar-code BC and unlock means M34 receives the signal and identify it with a preset secret bar-code. When the bar-code BC on the key K is identified with the secret bar-code, the unlock means M34 stops lock means M32 therefore locking, or halting, the release means M31. The release means M32 then release the automobile to move.

Figure 14:
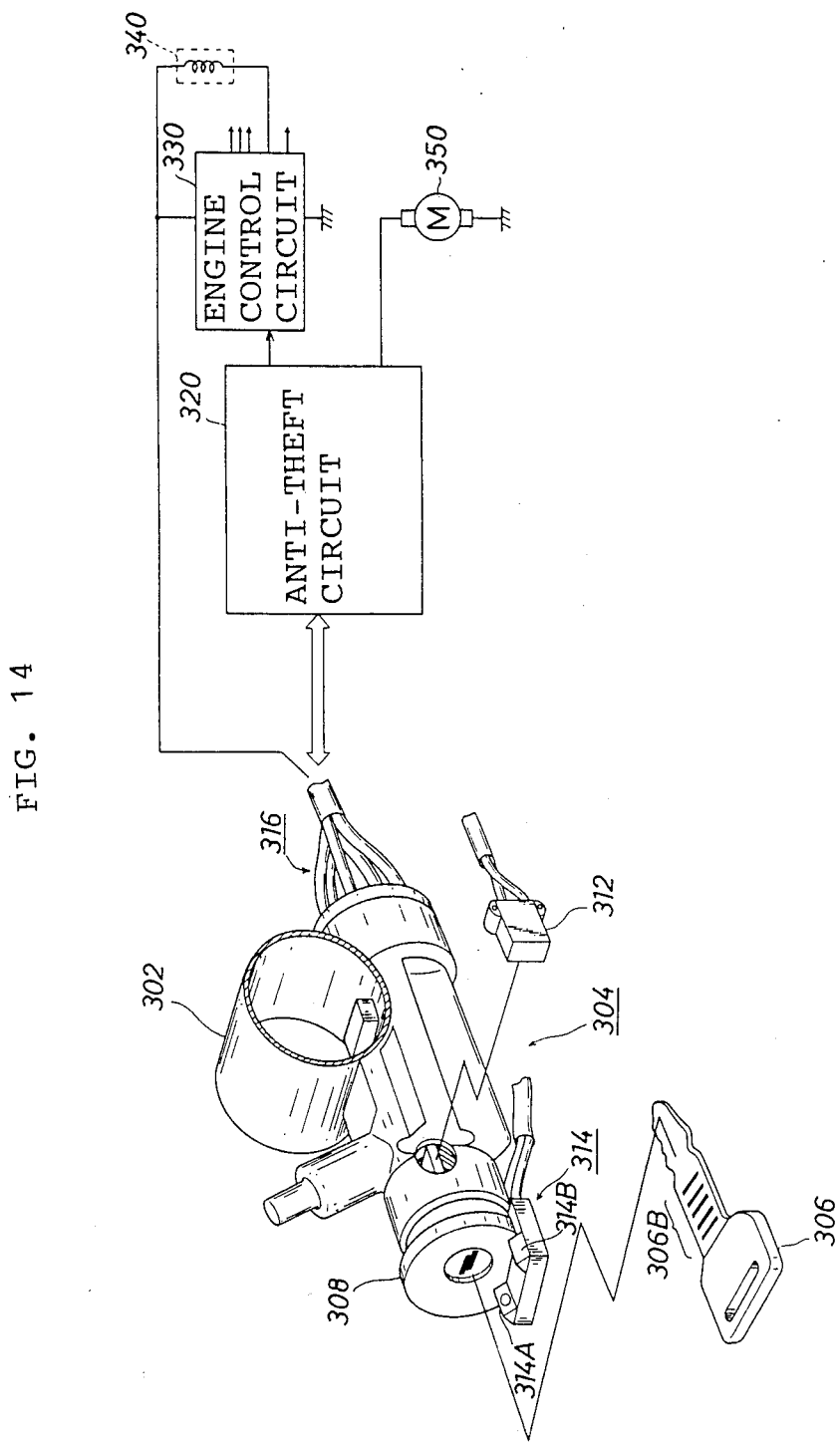
FIG. 14 is a perspective view of a key cylinder and a circuit diagram of the electrical circuit of the fourth embodiment of the invention.
Figure 15:
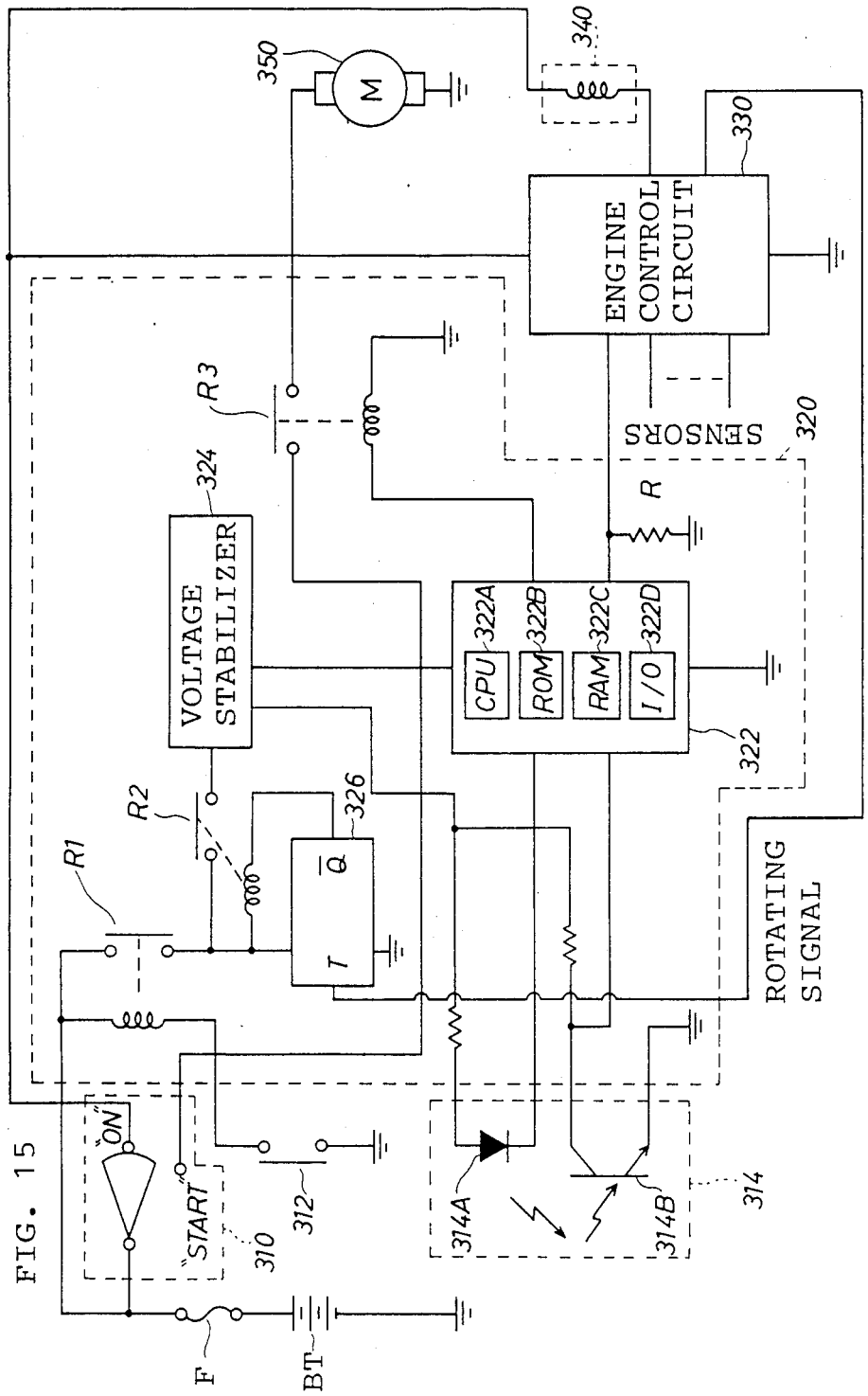
FIG. 15 is a circuit diagram of an anti-theft device according to the fourth embodiment.

The fourth embodiment is then explained in detail with FIGS. 14, 15, 16A and 16B. A perspective view of an ignition key and the cylinder and an electrical block diagram of the control circuit are shown in FIG. 14. A body of an ignition switch 304 is attached to a bracket 302 which is sustaining an upper column of a steering wheel (not shown). A switch 310 in FIG. 15 is provided in a key cylinder 308 of the key switch body 304 and is ON when an ignition key 306 is inserted into the key cylinder 308 and turned to the right. In order to detect that the key 306 is inserted into the key cylinder 308, a key detection switch 312 is provided at a side of the key cylinder 308. The key detection switch 312 is ON when the key 306 is inserted into the cylinder 308. It can be made by a well-known limit switch or by a magneto- or photo-contactless switch. A bar-code reader 314 is provided at the entrance of the key cylinder 308 for reading a bar-code 306B printed on the key 306. It comprises, like an ordinary bar-code reader, a light emitting diode (LED) 314A and a photo transistor 314B that detects a light reflected at the bar-code surface and generates a corresponding signal. The signal and signals from the other switches are transmitted to an anti-theft circuit 320, an engine control circuit 330 and a fuel injector 340 by cables 316. A starting motor 350 is connected to the anti-theft circuit 320 and its power supply is controlled by the circuit 320.

A detailed circuit diagram is shown in FIG. 15. The anti-theft circuit 320 comprises an electronic control unit (ECU) 322, 3 relays R1, R2 and R3, a voltage stabilizer 324 and a T-flip-flop 326. The switch 310 has two positions: an ON position in which only a first contact point is closed when the ignition key 306 is turned to a first stage; and a START position in which both the first and a second contact points are closed when the key 306 is further turned. The key 306 is returned from the START position to the ON position by a returning force of a spring in the key cylinder 308 when the applied turning torque is removed. At the ON position, electricity is supplied from a main battery BT of the automobile to the ECU 322 and the fuel injector 340 via a fuse F. At the START position, the battery BT is further connected to the relay R3.

One terminal of the relay R1 is directly connected to the battery BT and the other terminal is connected to the ground via the key detection switch 312. Therefore, when the ignition key 306 is inserted into the key cylinder 308, the key detection switch 312 is ON, the contact point of the relay R1 is closed and the other part of the anti-theft circuit 320 is powered by the battery BT. The bar-code reader 314 is connected to the voltage stabilizer 324 and the ECU 322 of the anti-theft circuit 320 to be supplied with power and to transmit the bar-code signal. A signal transmitted from the ECU 322 to the engine control circuit 330 is a release signal; the engine control circuit 330 keeps non-operating even if power is supplied via the switch 310 until the release signal is inputted from the ECU 322. The starting motor 350 is connected to the battery BT via the relay R3. Therefore, the starting motor 350 does not work until the contact point of the relay R3 is closed by the ECU 322.

The ECU 322 comprises a CPU 322A which performs logic calculations, a ROM 322B which stores a program for executing the operations, a RAM 322C which temporarily stores intermediate results and an I/O port 322D.

Figure 16A:
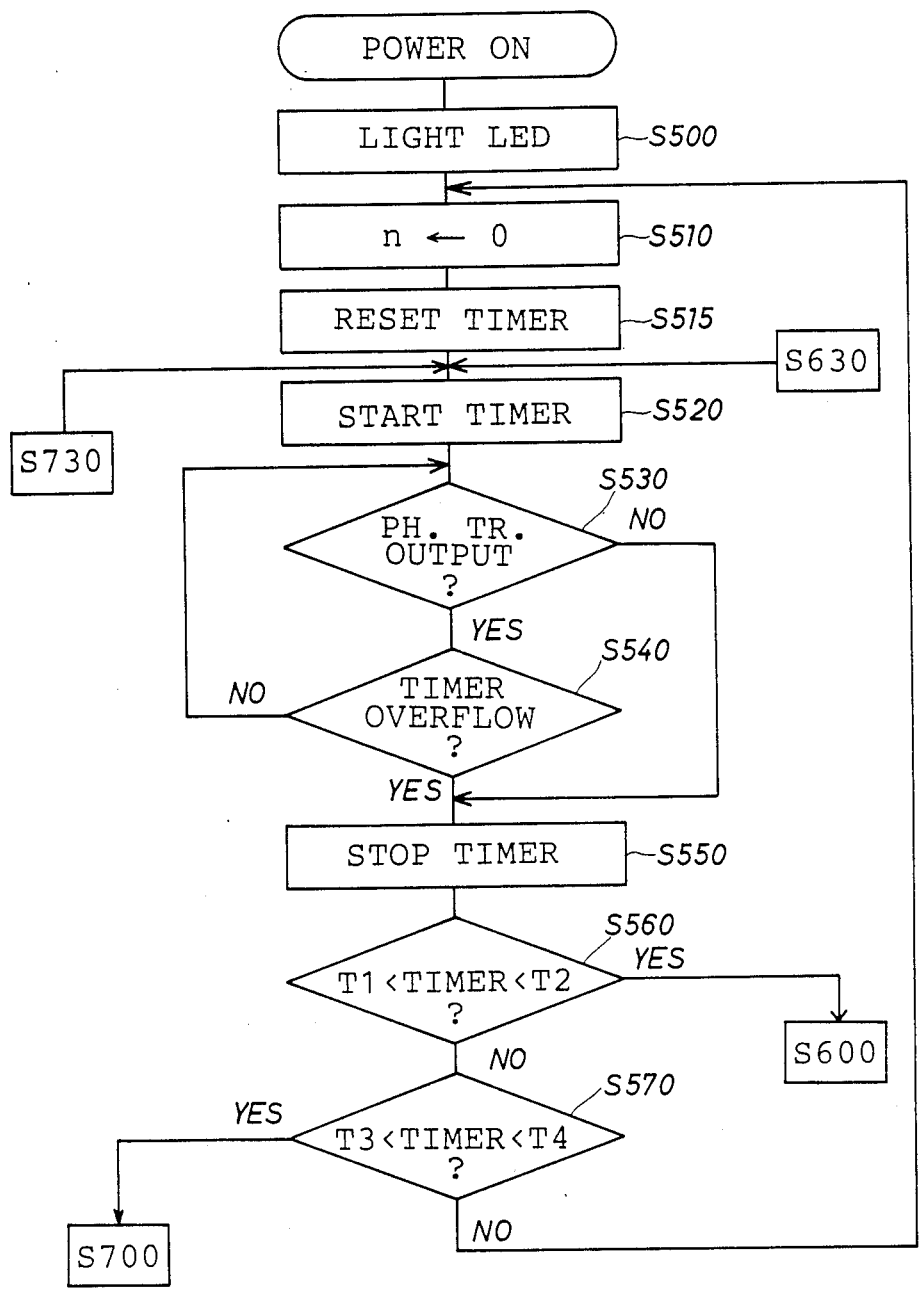
FIGS. 16A and 16B are flowcharts integrally describing a program of a routine performed by the anti-theft ECU of the fourth embodiment.
Figure 16B:
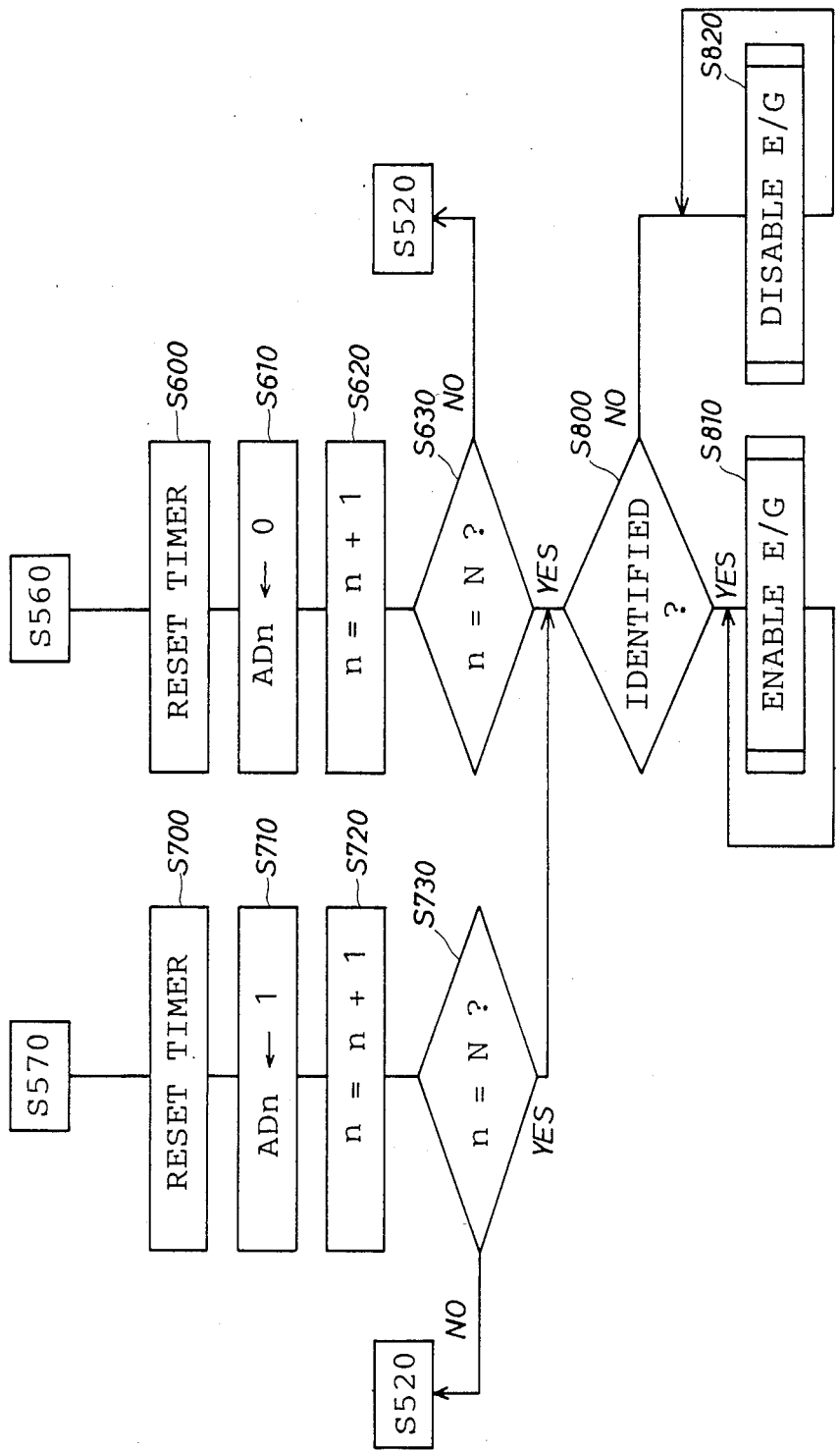

The following is an explanation of the operations of the anti-theft circuit 320 when the ignition key 306 with the bar-code 306B is inserted and turned to the START position. When the key 306 is inserted into the key cylinder 308, the key detection switch 312 is ON, the contact point of the relay R1 is ON and the flip-flop 326 is set, i.e., the voltage level of an output terminal Q of the flip-flop 326 is low (Lo). Consequently, the contact point of the relay R2 is closed and the voltage stabilizer 324 is connected to the main battery BT. The voltage stabilizer supplies power to the ECU 322 and the ECU 322 starts executing the program stored in the ROM 322B. Flowcharts of the program are shown in FIGS. 16A and 16B. The time interval from the time point when the key 306 is inserted to the time point when the ECU 322 starts operating is as short as several miliseconds to several tens of miliseconds. So the key 306 is still being inserted in the key cylinder 308 when the ECU 322 starts operating.

First at step S500, the ECU 322 sets the voltage of the line connected to the LED 314A of the bar-code reader 314 at low, making the voltage stabilizer 324 supply power to the LED 314A to light it. The bar-code reader 314 then starts reading a bar-code 306A on the key 306. At step S510, a variable n is set to 0 and, at step S515, a timer which is used later is reset to 0. The variable n is used for indicating the code length of the bar-code 306B. For example, when the bar-code 306B is composed of 6 bars, each representing 1 or 0, the code length is 6. The variable n is used for counting to get a 0-th data (AD0), a 1-st data (AD1), . . . , a 5-th data (AD5) from the 6 bars consecutively. Then the timer starts counting at step S520 and it is determined whether or not there is an output from the photo-transistor 314B at step S530. When there is an output from the photo-transistor 314B, it means that the light from the LED 314A is reflected on the reflective surface of the key 306 but not on the bars of the bar-code 306B. While the light from the LED 314A is scanning the reflective surface, the timer counts until it exceeds a preset value, at step S540. When the light from the LED 314A is reflected on a printed bar of the bar-code 306B, the light is absorbed by the printed bar and is not detected by the photo-transistor 314B. Then, as there is no output from the photo-transistor 314B, step S550 is executed to stop the timer and it is determined at step S560 whether or not the value of the timer is between T1 and T2. If the result is NO, it is determined whether or not the value is between T3 and T4. These values T1, T2, T3 and T4 are preset to satisfy a relation T1 T2 T3 T4. Here the relationship A B means that B is by far greater than A. If the value of the timer is not in either range T1 to T2 or T3 to T4, it is determined that the bar-code 306B is not yet aligned with the detection site of the bar-code reader 314 or that the detection is erroneous because, e.g., the key 306 is inserted into the key cylinder 308 very slowly. In that case, the process step returns to step S510. If the value of the timer is between T1 and T2, step S600 is executed to reset the timer to 0 and a value 0 is assigned to a variable ADn, where n is one of 0 through 5, at step S610. The number n is increased by 1 at step S620 and it is determined whether or not it is equal to a preset number N at step S630. Here the number N is a code length of the preset secret bar-code. If the result is NO at step S630, it is determined that all bars of the bar-code 306B on the key 306 are not yet read and step S520 is executed next.

If the value of the timer is determined to be between T3 and T4, steps S700 through S730 are executed, similarly to steps S600 through S630. This time, however, a value 1 is assigned to a variable ADn.

When it is determined that all the bars on the key 306 are detected at step S630 or at step S730, it is then determined at step S800 whether or not the array of data AD0, AD1, ..., ADN-1 is identical with a preset secret code stored in the ROM 322B. If the identification is positive at step S800, the engine is enabled at step S810. Otherwise, the engine is disabled at step S820. In addition, the contact point of the relay R3 is closed to enable the starting motor 350 and a start signal is outputted to the engine control circuit 330 at step S810.

The above processes are completed before the ignition key 306 is thoroughly inserted into the key cylinder 308. Therefore, when the key 306 is then turned to the right to the START position, the engine is enabled to start if the key 306 is an authentic one with a right bar-code 306B; the starting motor 350 is supplied with power and the engine control circuit 330 starts controlling the fuel injector 340 according to the driving conditions detected from various sensors on the automobile. If the key is not an authentic one, i.e., its bar-code is false or there is no bar-code on it, the engine is disabled, the starting motor 350 is disconnected from the battery BT and the engine control circuit 330 does not operate.

When the starting operation of the engine is finished with the authentic key 306, the anti-theft circuit 320 then operates as follows. As the engine is rotating, a rotating signal is transmitted from the engine control circuit 330 to the T-flip-flop 326, making the T terminal of the flip-flop 326 high (Hi) state. Accordingly the Q terminal becomes high, the contact point of the relay R2 is opened and the voltage stabilizer 324 is disconnected from the battery BT. Therefore, the anti-theft ECU 322 stops operating. As the line for the start signal from the anti-theft ECU 322 to the engine control circuit 330 is grounded via a resistance R, there is no possibility that a noise is inputted into the terminal of the engine control circuit 330.

This embodiment is constructed such that it has the following advantages. First, it is easy for an authentic driver to start the engine and no additional operation is required besides normal starting operation. The bar-code 306B is easily printed on the key 306 at low cost. The reliability of security is good because the bar-code reading is sure and the variety of the bar-code is large. An erroneous operation of the anti-theft circuit 320 that might stop the engine during driving is prevented because the anti-theft ECU 322 stops operating and does not generate the disable signal after the engine starts and the input terminal of the engine control circuit 330 from the anti-theft ECU 322 is proofed against noises.

Figure 17:
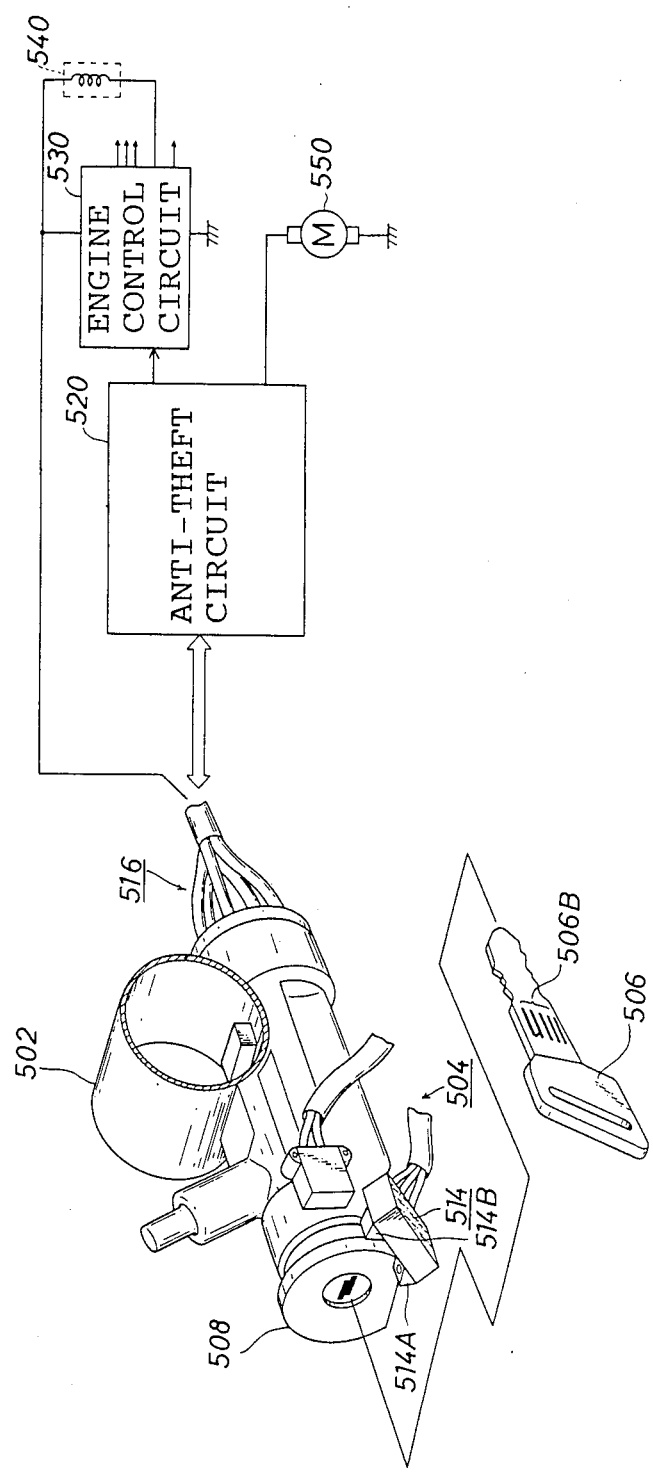
FIG. 17 is a perspective view of a key cylinder and a circuit diagram of the electrical circuit of the fifth embodiment of the invention.
Figure 18:
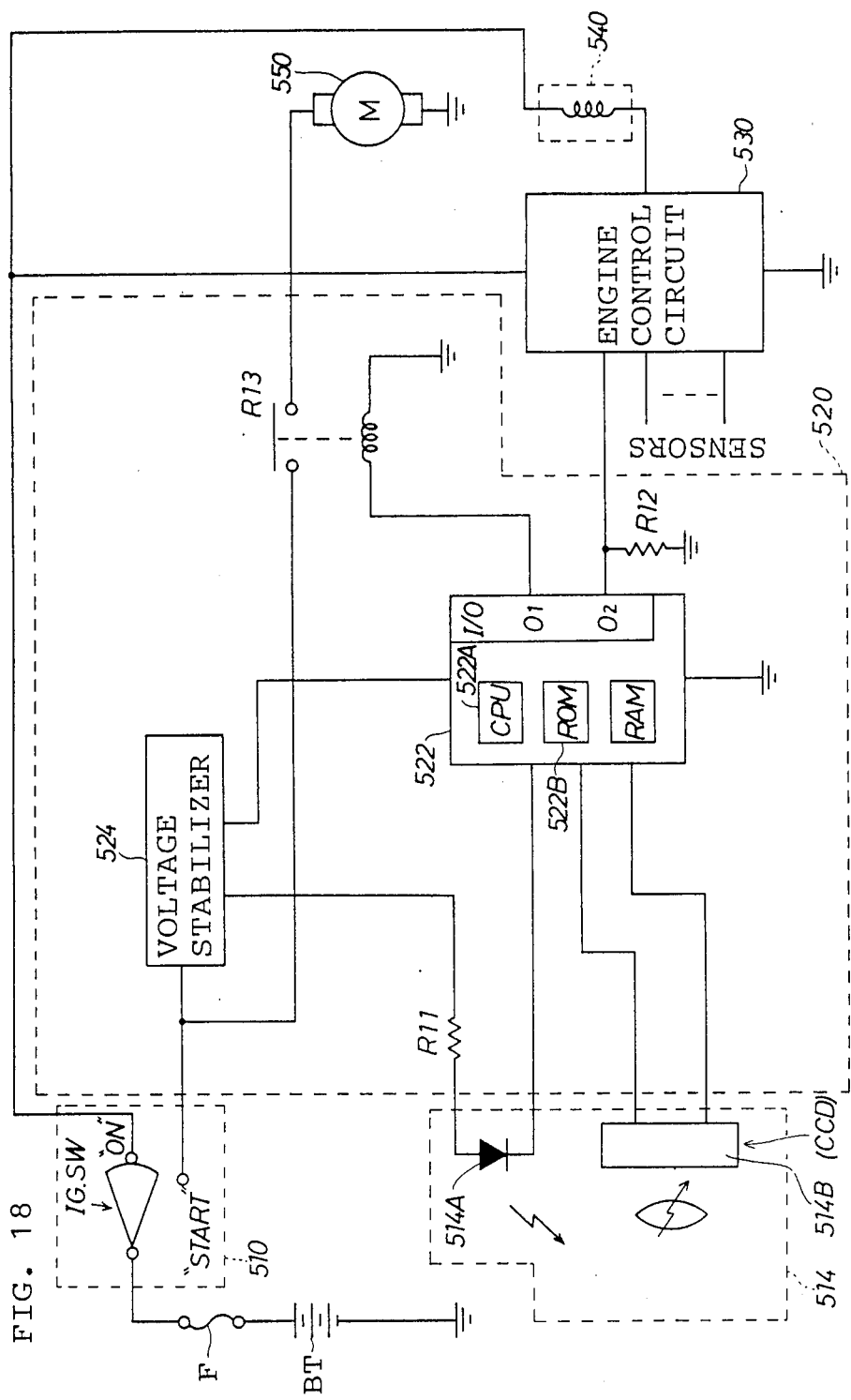
FIG. 18 is a circuit diagram of an anti-theft device according to the fifth embodiment of the present invention.
Figure 19:
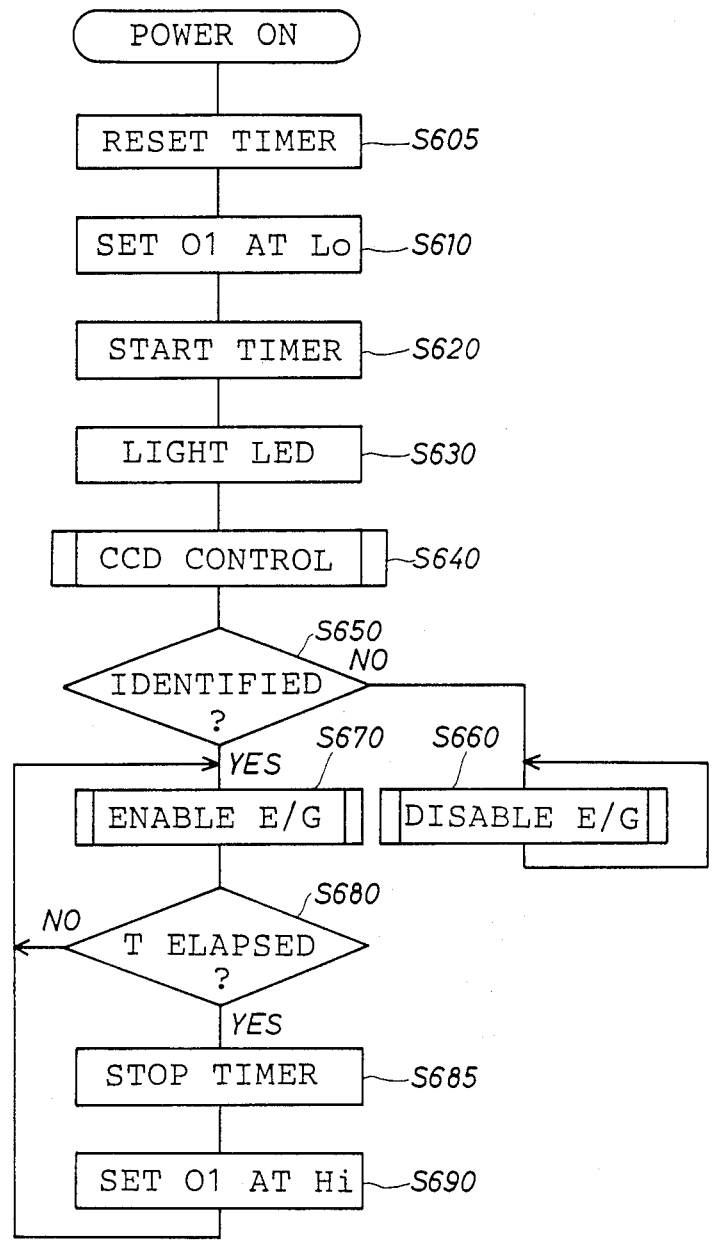
FIG. 19 is a flowchart describing a program of a routine performed by the anti-theft ECU of the fifth embodiment.

The fifth embodiment of the invention is then explained with reference to FIGS. 17, 18 and 19. FIG. 17 is similar to FIG. 14 of the fourth embodiment and the differences are as follows. First, a bar-code reader 514 is attached at the START position. A bar-code 506B on the key 506 is read when the key 506 is turned to the right to operate the starting motor 550. Second, an image sensor 514B is provided in the bar-code reader 514 instead of the photo-transistor 414B. An LED 514A is the same as the LED 414A in the fourth embodiment. Third, the bars of the bar-code 506B are arranged perpendicularly to the key inserting direction. Fourth, an anti-theft circuit 520 is different. A detail circuit diagram is shwon in FIG. 18.

When an ignition switch 510 is ON, a main battery BT is connected to an engine control circuit 530 and a fuel injector 540 via a fuse F. When the ignition switch 510 is at the START position, the battery BT is further connected to a voltage stabilizer 524 and a starting motor 550 via a relay R13. Like the fourth embodiment, the bar-code reader 514 is connected to the voltage stabilizer 524 and an anti-theft ECU 522 of the anti-theft circuit 520. The power to the LED 514A and the signal from the image sensor (CCD) 514B is controlled by the anti-theft ECU 522. Other components and construction of this embodiment are similar to those in the fourth embodiment.

The operations of the anti-theft circuit 520 is then explained. When the ignition key 506 is inserted into the key cylinder 508 and turned to the right to the START position passing the ON position, the voltage stabilizer 524 is connected to the battery BT and the anti-theft ECU is supplied with power from the battery BT. Then the anti-theft ECU 522 starts operating according to a preset program stored in a ROM 522B. FIG. 19 is the flowchart of the program.

When the routine is started, a timer is reset to 0 at step S605 and an output port 01 of an I/O section of the anti-theft ECU 522 is set at low (Lo) level at step S610. By this operation, the starting motor 550 is disconnected from the battery BT. Then the timer starts counting at step S620 and the line to the LED 514A is set to a low level to supply electricity from the battery BT to the LED 514A at step S630. Accordingly, the bar-code 506B on the key 506 is read.

As step S640, a CCD control is performed in which an image of the bar-code 506B on the CCD (charge coupled device) surface is scanned to detect the brightdark pattern of the bar-code 506B. Then at step S650, it is determined whether or not the detected pattern code is identical with a secret code. If the identification fails, a disable signal is outputted from an output port 02 to the engine control circuit 530 at step S660. Consequently, the engine control circuit 530 cannot output an injection signal to the fuel injector 540.

When the bar-code 506B is identified with a secret code at step S650, an enable signal is outputted to the engine control circuit 530 at step S670 and the circuit 530 is able to control the fuel injector 540. Then it is determined whether or not the value of the timer is greater than a preset value T at step S680. The value T is preset in order to assure the reliability of the bar-code reading, e.g., at 0.5 second. Until the time interval T elapses, steps S670 and S680 are repeated. When T elapses, the timer is stopped at step S685 and the output port 01 is set at high (Hi) at step S690. Accordingly, the contact point of the relay R3 is closed and the starting motor 550 is supplied with power from the battery BT to start the engine.

Similarly to the fourth embodiment, the anti-theft circuit 520 stops operating after the engine starts and the key 506 is returned to the ON position. This embodiment is simpler in its structure and processes than the fourth embodiment.

In the above fourth and fifth embodiments, the anti-theft ECU's 322 and 522 are powered by the main battery BT through the voltage stabilizer 324 and 524, respectively. Of course, another power source, or a battery, may be prepared exclusively for the ECU's 322 and 522. In that case, the battery is provided on the same board as the anti-theft ECU's 322 and 522 for better security.

While the preferred embodiment of the invention has been described, it is to be understood that the invention is not limited thereto, and may be otherwise embodied within the scope of the following claims.

What is claimed is:

1. An anti-theft device for an automobile comprising:
   intrusion detection means for detecting an abnormal intrusion into the automobile and for generating an intrusion signal;
   disconnection detection means for detecting disconnection of a main battery of the automobile from the electrical equipment supplied thereby and for generating a disconnection signal;
   disable means for disabling a control circuit of an engine of the automobile in response to the intrusion signal or the disconnection signal; and
   release means for halting the disable means from disabling the control circuit when input data provided to the release means are identical with preset data.

2. An anti-theft device for an automobile according to claim 1, wherein the intrusion detection means comprises a flip-flop circuit which generates the intrusion signal in response to a set signal generated by a door lock switch and door switches provided on every door of the automobile when one of the door switches detects an opening of a door while the door lock switch is still detecting a locked condition.

3. The anti-theft device of claim 1 wherein the disconnection detection means comprises a Schmitt trigger ciricut and a condenser connected to the main battery for generating a pulse signal when the main battery is disconnected from the condenser, and a flip-flop circuit for generating the disconnection signal in response to the pulse signal.

4. The anti-theft device of claim 1 further comprising battery means separate from the automobile main battery for supplying power to said anti-theft device exclusive of the automobile main battery, said anti-theft device being not powered by the automobile main battery.

* * * * *